US011960525B2

(12) United States Patent
Hileman et al.

(10) Patent No.: US 11,960,525 B2
(45) Date of Patent: Apr. 16, 2024

(54) AUTOMATICALLY FORMATTING CONTENT ITEMS FOR PRESENTATION

(71) Applicant: DROPBOX, INC., San Francisco, CA (US)

(72) Inventors: Justin Hileman, San Francisco, CA (US); Scott Zhuge, San Francisco, CA (US); Kevin Ji, San Francisco, CA (US)

(73) Assignee: DROPBOX, INC, San Francisco, CA (US)

( * ) Notice: Subject to any disclaimer, the term of this patent is extended or adjusted under 35 U.S.C. 154(b) by 628 days.

(21) Appl. No.: 15/466,641

(22) Filed: Mar. 22, 2017

(65) Prior Publication Data

US 2018/0181549 A1 Jun. 28, 2018

Related U.S. Application Data

(60) Provisional application No. 62/439,875, filed on Dec. 28, 2016.

(51) Int. Cl.
*G06F 16/00* (2019.01)
*G06F 16/438* (2019.01)
(Continued)

(52) U.S. Cl.
CPC ........ *G06F 16/4393* (2019.01); *G06F 40/103* (2020.01); *G06F 40/106* (2020.01);
(Continued)

(58) Field of Classification Search
CPC .. G06F 17/211; G06F 17/212; G06F 17/2229; G06F 17/2247; G06F 17/248;
(Continued)

(56) References Cited

U.S. PATENT DOCUMENTS 7,069,497 B1 * 6/2006 Desai ................... G06F 16/958
715/205
7,243,302 B1 * 7/2007 Rej ....................... G06F 17/212
715/200

(Continued)

*Primary Examiner* — Cesar B Paula
*Assistant Examiner* — David Faber
(74) *Attorney, Agent, or Firm* — DLA PIPER LLP

(57) ABSTRACT

Disclosed are systems, methods, and non-transitory computer-readable storage media for automatically formatting content items for presentation. For example, in response to receiving an invocation of a presentation mode for a content item, a computing device can generate a tree structure representing the structure of the content item. The computing device can generate a presentation version of the content item based on a presentation template that defines the presentation formatting for the content item. The computing device can traverse the tree and determine a portion of the presentation version of the content item to present based on the amount of content that can fit within a display size of a display device. In some implementations, the computing device can determine portions of content to suppress and/or highlight based on various characteristics, metadata, comments, links, etc., corresponding to the portions of content in the content item.

20 Claims, 16 Drawing Sheets

(51) Int. Cl.
*G06F 40/103* (2020.01)
*G06F 40/106* (2020.01)
*G06F 40/131* (2020.01)
*G06F 40/14* (2020.01)
*G06F 40/143* (2020.01)
*G06F 40/186* (2020.01)

(52) U.S. Cl.
CPC ............ *G06F 40/131* (2020.01); *G06F 40/14* (2020.01); *G06F 40/143* (2020.01); *G06F 40/186* (2020.01)

(58) Field of Classification Search
CPC ............ G06F 17/30056; G06F 40/103; G06F 40/106; G06F 40/14; G06F 40/186; G06F 40/166; G06F 40/131; G06F 16/4393
USPC ........................................................ 715/234
See application file for complete search history.

(56) References Cited

U.S. PATENT DOCUMENTS

| | | | | |
|---|---|---|---|---|
| 8,407,576 | B1* | 3/2013 | Yin ........................ | G06F 3/0481 715/206 |
| 8,661,031 | B2* | 2/2014 | Chandra ................ | G06F 16/951 707/730 |
| 9,538,449 | B1* | 1/2017 | Reeves .................. | H04W 24/08 |
| 2005/0060647 | A1* | 3/2005 | Doan ..................... | G06F 16/248 715/205 |
| 2005/0125431 | A1* | 6/2005 | Emmick ................ | G06F 16/86 |
| 2007/0271309 | A1* | 11/2007 | Witriol .................. | G06F 16/27 |
| 2008/0244740 | A1* | 10/2008 | Hicks .................... | G06F 17/24 726/22 |
| 2009/0094242 | A1* | 4/2009 | Lo ......................... | G06F 16/1774 |
| 2010/0318892 | A1* | 12/2010 | Teevan .................. | G06F 16/958 715/229 |
| 2011/0119571 | A1* | 5/2011 | Decker ................. | G06F 17/30902 715/205 |
| 2011/0264705 | A1* | 10/2011 | Diamond .............. | G06F 17/218 707/803 |
| 2011/0302510 | A1* | 12/2011 | Harrison ............... | G06F 40/134 715/781 |
| 2012/0023447 | A1* | 1/2012 | Hoshino ............... | G06F 17/2735 715/823 |
| 2012/0110445 | A1* | 5/2012 | Greenspan ........... | G06F 17/2288 715/256 |
| 2013/0145255 | A1* | 6/2013 | Zheng .................. | G06F 16/9535 715/234 |
| 2013/0346843 | A1* | 12/2013 | Murray ................. | G11B 27/34 715/212 |
| 2014/0279716 | A1* | 9/2014 | Cormack .............. | G06F 16/285 706/11 |
| 2014/0281873 | A1* | 9/2014 | Frew .................... | G06F 17/2288 715/229 |
| 2015/0127668 | A1* | 5/2015 | Trottier ............... | G06F 17/2881 707/755 |
| 2015/0199307 | A1* | 7/2015 | Zhang .................. | G06F 17/2235 715/208 |
| 2015/0370760 | A1* | 12/2015 | Tigchelaar ........... | G06F 17/212 715/269 |
| 2016/0110313 | A1* | 4/2016 | Prakash ............... | G06F 17/2288 715/202 |
| 2016/0301766 | A1* | 10/2016 | Ionescu ................ | G06F 16/2329 |
| 2016/0344828 | A1* | 11/2016 | Hausler ............... | G06F 17/30011 |
| 2017/0024365 | A1* | 1/2017 | Emerick ............... | G06F 17/2247 |
| 2017/0185573 | A1* | 6/2017 | Milvaney ............. | G06F 17/2288 |
| 2017/0220587 | A1* | 8/2017 | Srinivasan ........... | G06F 17/212 |
| 2018/0129634 | A1* | 5/2018 | Sivaji .................. | G06F 40/106 |

* cited by examiner

AUTOMATICALLY FORMATTING CONTENT ITEMS FOR PRESENTATION

RELATED APPLICATION

This Application claims the benefit of U.S. Provisional Application No. 62/439,875, filed on Dec. 28, 2016, and which is incorporated herein by reference.

BACKGROUND

Digital documents are used ubiquitously to share information among people socially, in the work environment, and in other contexts. Most times, these documents are shared through electronic messages (e.g., emails, instant messages, etc.). Sometimes documents are shared among people by projecting the contents of the documents on a wall or displaying the documents on a television set for all present to see. When the document is not a presentation type document (e.g., slide show document), the documents may not be formatted and/or sized correctly to allow the contents of the document to be easily seen and understood by the people viewing the presented documents.

SUMMARY

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for automatically formatting content items for presentation. For example, in response to receiving an invocation of a presentation mode for a content item, a computing device can generate a tree structure representing relationships among portions of the content item. For example, the tree structure can include nodes representing headers, sections, paragraphs, and/or interesting content within the content item. The computing device can generate a presentation version of the content item based on a presentation template that defines how the various portions of the content item will be formatted in the presentation. The computing device can traverse the tree and determine groups of content item portions to include on one or more presentation views (e.g., presentation slides), based on the relationships among the portions identified in the tree, sizes of the portions in the presentation version of the content item, and an amount of content that can fit within a display area. In some implementations, the computing device can determine portions of content to suppress and/or highlight when creating the tree structure or when applying content item styles in the creation of the presentation version, based on various characteristics, metadata, comments, links, etc., corresponding to the portions of content in the content item.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a convenient way to format content items for presentation. For example, users frequently try to share content items (e.g., text documents, pdfs, etc.) that are not created for presentation (e.g., as opposed to slide show documents that are created for presentation) with other people by projecting the contents of the content item or presenting the contents of the content item on a large display (e.g., television, monitor, etc.). Since the content items are not specifically formatted for presentation in a large format display, the presented content may be difficult to read, may be presented poorly, or may be organized in a strange way. The embodiments described herein overcome these deficiencies in presenting content items by reformatting the content item according to the dimensions of the desired display area (e.g., virtual window area, physical display area, projection area, etc.) and dynamically and intelligently generating slides that include selected content from the content item. For example, the computing device can automatically select which portions of content from the content item to present in a slide based on the structure of the content item and/or indicia of importance (or interest) associated with various portions of the content item. Thus, the computing device can automatically and intelligently generate a slideshow-like presentation of content in the content item without requiring the user to actually create a slideshow document and select content for each slide in a slideshow.

Figure 1A:
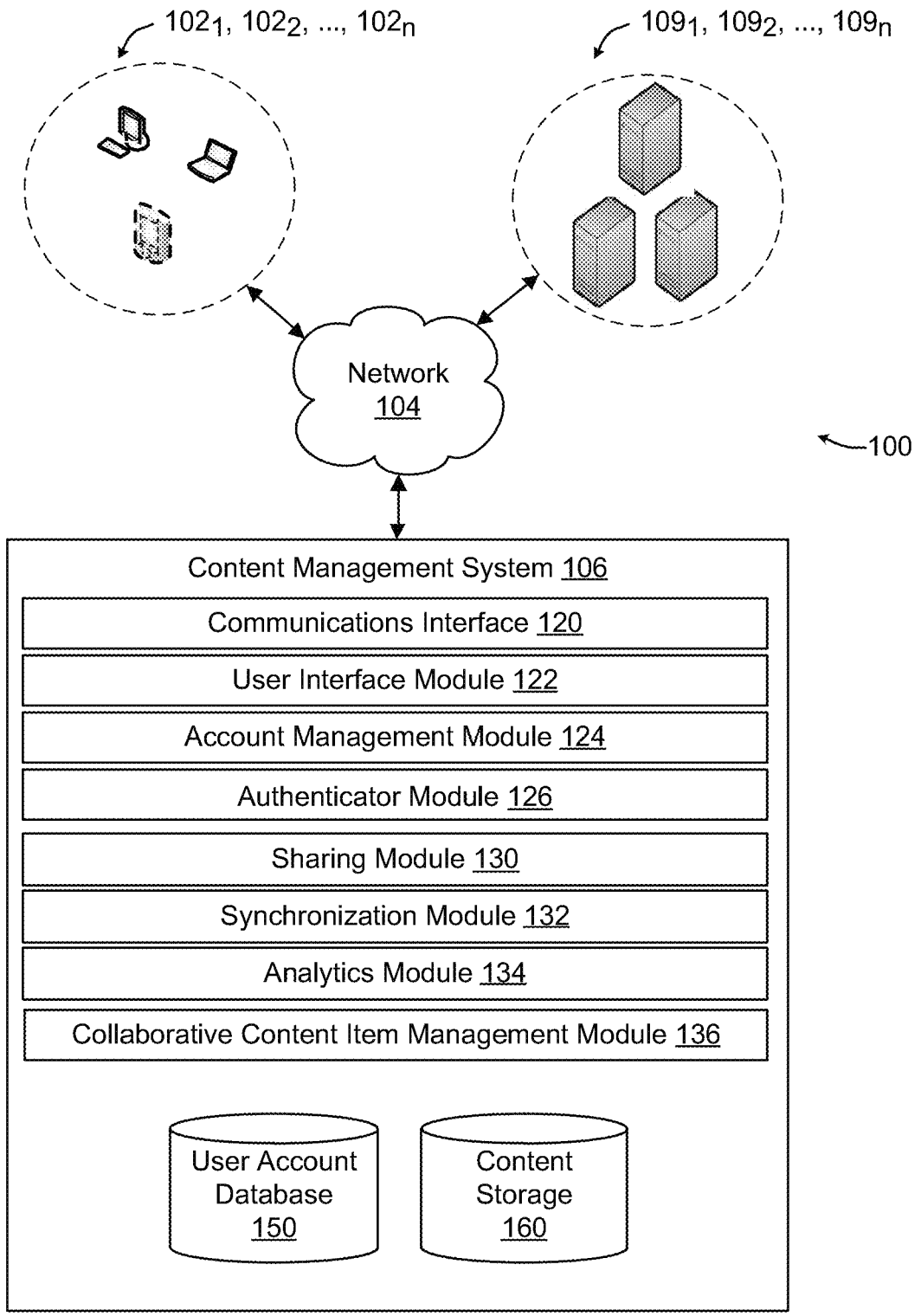
FIG. 1A shows an example configuration of devices and a network in accordance with some embodiments.

With respect to implementing various embodiments of the disclosed technology, an example system configuration 100 is shown in FIG. 1A, wherein electronic devices communicate via a network for purposes of exchanging content and other data. The system can be configured for use on a wide area network such as that illustrated in FIG. 1A. However, the present principles are applicable to a wide variety of network configurations that facilitate the intercommunication of electronic devices. For example, each of the components of system 100 in FIG. 1A can be implemented in a localized or distributed fashion in a network.

In system 100, a user (e.g., an individual, group of users, company, etc.) can interact with content management system 106 (e.g., an online synchronized content management system) through client devices $102_1, 102_2, \ldots, 102_n$ (collectively "102") connected to network 104 by direct and/or indirect communication. Content management system 106 can include a single computing device (e.g., a server) or multiple computing devices (e.g., multiple servers) that are configured to perform the functions and/or operations necessary to provide the services described herein. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content items, as well as perform a variety of content management tasks, such as retrieve, modify, browse, and/or share the content items. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type, usage information, (e.g., file access or edit history), storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content items, such as digital data, documents, collaborative content items, text files, audio files, image files, video files, webpages, executable files, binary files, placeholder files that reference other content items, etc., from one or more client devices 102 authorized on the account. The content items can also include collections for grouping content items together with different behaviors, such as folders, playlists, albums, etc. For example, an account can include shared collections or group collections that are linked with and available to multiple user accounts. The permissions for multiple users may be different for a shared collection.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items from one or more client devices 102. The synchronization can be platform agnostic. That is, the content items can be synchronized across multiple client devices 102 of varying type, capabilities, operating systems, etc. For example, client device 102$_i$ can include client software, which synchronizes, via a synchronization module 132 at content management system 106, content in client device 102$_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or can be some combination thereof. In one example of client software that integrates with an existing content management application, a user can manipulate content items directly in a local collection, while a background process monitors the local collection for changes and synchronizes those changes to content management system 106. Conversely, the background process can identify content items that have been updated at content management system 106 and synchronize those changes to the local collection.

A user can view or manipulate content via a web interface generated and served by user interface module 122. For example, the user can navigate in a web browser to a web address provided by content management system 106. Changes or updates to content in the content storage 160 made through the web interface, such as making edits to text or media that are part of the content item, can be propagated to other client devices 102 authorized to access the content item. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers 109$_1$, 109$_2$, ..., 109$_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content items. Sharing content items can include making the content item accessible from any computing device in network communication with content management system 106. Sharing content items can also include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some implementations, to share a content item, sharing module 130 can be configured to add a user account identifier to the content entry associated with the content item, thus granting the added user account access to the content item. Sharing module 130 can also be configured to remove user account identifiers from a content entry to restrict a user account's access to the content item.

In some implementations, to share a content item, sharing module 130 can be configured to generate a custom network address, such as a uniform resource locator (URL), which allows web browsers to access the content in content management system 106, which in some implementations, can be allowed without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In some implementations, content management system 106 can include collaborative content item management module 136. Collaborative content item management module 136 can provide an interactive content item collaboration platform whereby users can simultaneously create collaborative content items, comment in the collaborative content items, and manage tasks within the collaborative content items. Collaborative content items can be files that users can create and edit using a collaborative content items editor, and can contain collaborative content item elements. Collaborative content item elements may include a collaborative content item identifier, one or more author identifiers, collaborative content item text, collaborative content item attributes, interaction information, comments, sharing users, etc. Collaborative content item elements can be stored as database entities, which allows for searching and retrieving the collaborative content items. Multiple users may access, view, edit, and collaborate on collaborative content items at the same time or at different times. In some embodiments this can be managed by providing multiple users with access to a content item through a web interface where they can work on the same copy of the content item at the same time.

In some implementations, portions of a collaborative content item can be represented by a list of attributed text (e.g., a string of text where each character or character range has a set of attributes). An attribute can be a (key, value) pair: for example, ("bold", "true"), ("list", "bullet1"), or ("author", authorID). Furthermore, a collaborative content item can be stored as a sequence of change sets. A change set represents an edit to a particular version of a collaborative content item. Applying a change sets can insert and delete characters and apply attributes to ranges. Thus, a given change set can be applied to a particular collaborative content item representation to generate another collaborative content item representation. For example, a collaborative content item representation "abc\n" and a change set "insert d at position 2", which when applied, would yield a collaborative content item representation "abdc\n". Applying all of the change sets, in a given order, to an initial version of a collaborative content item representation, can produce a current version of the collaborative content item comprising a list of attributed text representation. Multiple users may access, view, edit, and collaborate on a collaborative content item at the same time or at different times. In some embodiments this can be managed by providing multiple users with access to a content item through a web interface where they can interact with a same copy of the content item at the same time.

While content management system 106 is presented with specific components, it should be understood by one skilled in the art, that the architectural configuration of system 106 is simply one possible configuration and that other configurations with more or fewer components are possible.

Figure 1B:
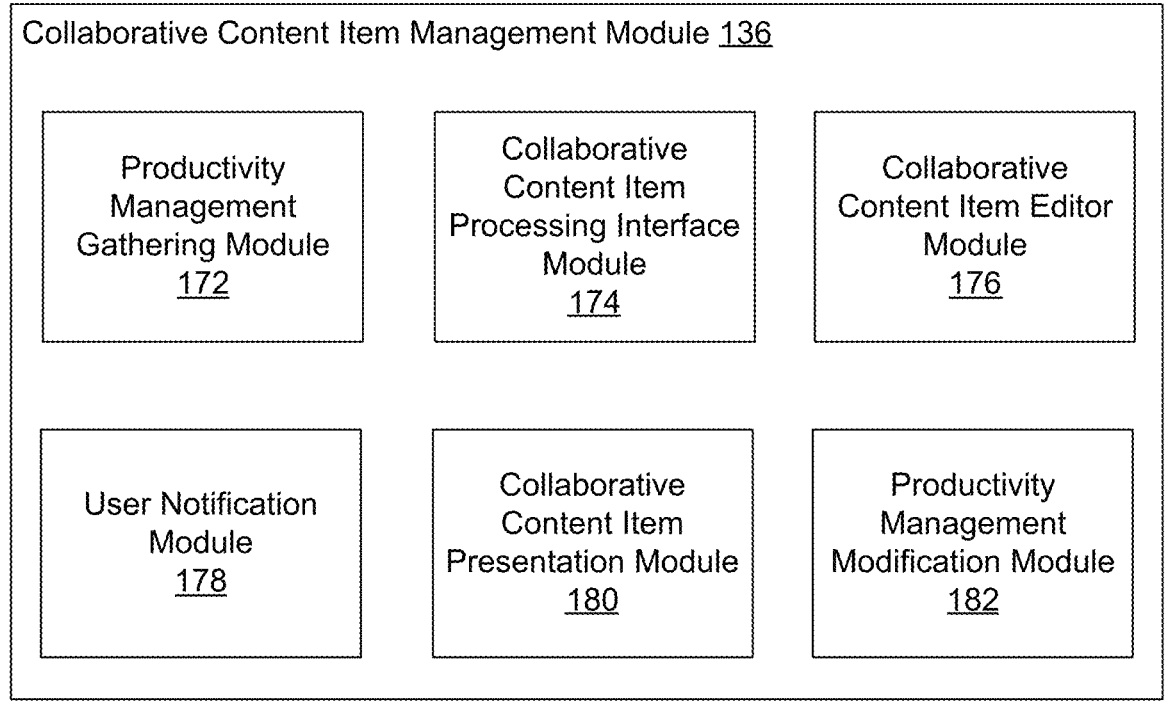
FIG. 1B is a block diagram of an example system for managing collaborative content items.

FIG. 1B shows an example collaborative content item management module 136, according to some embodiments. Collaborative content item management module 136 may include productivity management gathering module 172, collaborative content item processing interface module 174, collaborative content item editor module 176, user notification module 178, collaborative content item presentation module 180, and productivity management modification module 182. One or more of productivity management gathering module 172, collaborative content item processing interface module 174, collaborative content item editor module 176, user notification module 178, collaborative content item presentation module 180, and productivity management modification module 182 may be coupled to one another or to modules not explicitly shown.

Productivity management gathering module 172 may be configured to gather productivity data from productivity management system 140. In various embodiments, productivity management gathering module 172 identifies an event and gathers information related to the event. For instance, productivity management gathering module 172 may gather a specific calendar entry and/or a specific task from an online calendar. Productivity management gathering module 172 may further gather information from the calendar entry or gather information related to the calendar entry such as time(s), date(s), relevant locations, title(s), agenda(s), summaries, description(s), and/or attendees related to the event. Productivity management gathering module 172 may provide the productivity data to the other modules of collaborative content item management module 136.

Collaborative content item processing interface module 174 may be configured to interface with collaborative content item management module 136. In various embodiments, collaborative content item processing interface module 174 may provide collaborative content items to one or more modules of collaborative content item management module 136, as described further herein.

Collaborative content item editor module 176 may be configured to create and/or modify collaborative content items. A collaborative content item may be created in a variety of ways. In some embodiments, collaborative content item editor module 176 enables creation of the collaborative content item into the content management system 106. Collaborative content item editor module 176 may enable access to or be any collaborative content item editing application (e.g., Microsoft Word®, Google Docs®, or the like) either in the cloud or executed locally. In one example, content management system 106 may provide to one of client devices 120 a user interface element (e.g., a box or a button) that allows creation of a new collaborative content item.

In some embodiments, collaborative content item editor module 176 may create the collaborative content item in conjunction with the productivity management system 140. For example, collaborative content item editor module 176 may provide a suggestion to a user to create or invoke a collaborative content item associated with an upcoming event. In various embodiments, collaborative content item management module 136 may identify a user that is opening or otherwise using collaborative content item editor module 176. Productivity management gathering module 172 may identify an upcoming event for the user on the user's calendar. Subsequently, collaborative content item editor module 176 may provide a suggestion to the user to create or invoke the collaborative content item associated with the upcoming event.

Although it is discussed that collaborative content item editor module 176 may provide a suggestion to the user to create or invoke the collaborative content item associated with the upcoming event, it will be appreciated that the suggestion to create or invoke the collaborative content item may be made by any application. For example, a user may log into and/or otherwise access any application or suite of applications. Once the user is identified and an upcoming event is identified on the user's calendar, any application may provide the user with the suggestion to create or invoke the collaborative content item associated with the upcoming event. The suggestion may be provided to the user in any number of ways. In one example, an application suite management system (e.g., managing a variety of different applications) may provide the suggestion in a notification section of a window. In another example, a workspace may include the suggestion to the user in a section dedicated to notifications. In a further example, an email program may generate an email containing the suggestion to the user.

If the user requests creation or invocation of the collaborative content item in response to the suggestion, collaborative content item editor module 176 may create or invoke the requested collaborative content item. If the application that provided the suggestion to the user is not a collaborative content item editor, then a collaborative content item editor may be executed and the requested collaborative content item created and/or invoked in response to the user's request.

In accordance with some embodiments, collaborative content item editor module 176 may configure the productivity management system 140 to provide access to the collaborative content item (e.g., using a link, including the collaborative content item, or any other mechanism to enable access to the collaborative content item) in a meeting request, a task entry, or the like. In some embodiments, collaborative content item editor module 176 may instruct productivity management system 140 to place an icon corresponding to a link to the collaborative content item in the calendar entry, meeting request, task entry, or the like. When a user has opened the link (e.g., by clicking the icon), the user may be directly guided to the collaborative content item from the meeting request, task entry, or the like. In one example, the link in the calendar entry may provide the user (e.g., using client device 102) access to a collaborative content item stored in content management system 106 (e.g., in storage accessible through the cloud) or in productivity management system 140.

Once the user requests to create or invoke the collaborative content item, collaborative content item editor module 176 may create and/or invoke a collaborative content item. The collaborative content item may be subsequently edited, altered, viewed, changed, stored, and/or the like by an editing application (e.g., either stored locally on a client device 102 or in the cloud). In various embodiments, one or more different client devices 120 may utilize different editing applications to make changes to the collaborative content item. Collaborative content item editor module 176 and/or other editing applications may allow for the collaborative content item to be changed by multiple different users using different client devices 120 at the same time or substantially at the same time (e.g., in real time or substantially in real time).

It will be appreciated that users may be automatically guided to a collaborative content item related to a calendar entry, meeting request, a task entry, or the like without human intervention. In some embodiments, users may be guided to a collaborative content item related to a calendar entry, a meeting request, a task entry, or the like without having the users separately open collaborative content item editing applications. Such functionalities may prove particularly convenient for users seeking to take, review, or collaborate on notes associated with an event, as these users need not open applications other than productivity management applications.

Collaborative content item editor module 176 may receive from users additional content for the collaborative content item. For example, collaborative content item editor module 176 may be configured to receive from the client devices 102 changes or edits to the collaborative content item. In various embodiments, the changes may include text, characters strings, or the like. The changes may also include annotations to the collaborative content item, comments to the collaborative content item, files to be attached to the collaborative content item, pictures to be attached to the collaborative content item, links to be attached to the collaborative content item, tasks related to the collaborative content item, or the like that can be incorporated into the collaborative content item. In various embodiments, edits to the collaborative content item are collaborative. For instance, collaborative content item editor module 176 may obtain edits (e.g., text changes and/or additions of audio files, pictures, tables, or the like) from any number of client devices 102 at a given time (or in real time). Collaborative edits may be incorporated in a variety of formats, including formats that provide different text attributes such as colors, fonts, styles, or the like for different users.

In various embodiments, collaborative content item editor module 176 (and or a security or permissions module associated with a server) may establish permissions and/or security for the collaborative content item. For example, collaborative content item editor module 176 may enable event attendees to view and/or make edits to the collaborative content item while others may not have rights to view the collaborative content items and/or make changes. Permissions and/or security may be enforced in any number of ways. However, access to the collaborative content item may, in various embodiments, be provided to attendees of the event or a subset of attendees.

In various embodiments, access to the collaborative content item is limited based on storage access rights. For example, a user with access rights to cloud storage may access, view, and/or make changes to the collaborative content item. In some embodiments, a user with access rights assigned by the content management system 106 may access, view, and/or make changes to the collaborative content item.

User notification module 178 may be configured to notify users of each of the client devices 102 of information related to the state and/or contents of the collaborative content item. Notifications may be sent, for example as an email notification, a chat message notification, a notification in a display of the collaborative content item, or in relation to the collaborative content item through a file system or other organizational system. In various embodiments, user notification module 178 provides notifications about changes to the client devices 102. For example, user notification module 178 may notify users whether a collaborative content item has been created for an event. As another example, user notification module 178 may notify specific users that they have been invited to attend an event.

Collaborative content item presentation module 180 may provide to the client devices 102 selected collaborative content items. The collaborative content items may be displayed in the client devices 102 through a native application, an Internet browsing window, or the like supported by the client devices 120 . . . .

It will be appreciated that collaborative content item presentation module 180 may restrict writing permissions to the collaborative content items at any time. In an example, prior to occurrence of the event, collaborative content item presentation module 180 may restrict writing permissions to the collaborative content item (and turn the collaborative content item into a read-only collaborative content item) for all users except the creator or invoker of the collaborative content item. In some embodiments, the creator or invoker of the collaborative content item may select a subset of recipients to receive writing permissions.

Collaborative content item presentation module 180 may also support a collaborative content item viewing portal users can use to view existing collaborative content items. The collaborative content item viewing portal may order specific collaborative content items based on one or more ordering factors. "Ordering factors," as used herein, may include any factors used to order collaborative content items. Ordering factors can include factors used to order collaborative content items chronologically. More specifically, in some embodiments, the collaborative content item viewing portal orders collaborative content items according to the date(s) and/or times the collaborative content items were created. The collaborative content item viewing portal may also order collaborative content items according to the date(s) and/or time(s) the collaborative content items were edited. In various embodiments, the collaborative content item viewing portal orders collaborative content items according to the date(s) and/or time(s) of corresponding events to which the collaborative content items were related. Ordering factors can also include factors used to order collaborative content items according to the preferences of a specific user, such as whether the user has accepted events to which the collaborative content items were related.

In some embodiments, a collaborative content item viewing portal may be dedicated to a particular user who has received access to the collaborative content item because the particular user was related to an event. The user's collaborative content item viewing portal may provide access to any number of collaborative content items including the collaborative content item. The collaborative content items represented in the collaborative content item viewing portal may be ordered in any number of ways. For example, the collaborative content item viewing portal may order collaborative content items based on date and time of corresponding events.

The collaborative content item viewing portal may support search functions. For instance, the collaborative content item viewing portal may enable or allow searching for collaborative content items according to textual strings, titles, event attendees, and/or other attributes. The search functions may allow a specific user to search one or more collaborative content items for that user or for other users.

In some embodiments, productivity management modification module 182 may be configured to coordinate collaborative content items with calendar entries and to enable access to the collaborative content item through calendar entries.

Figure 2:
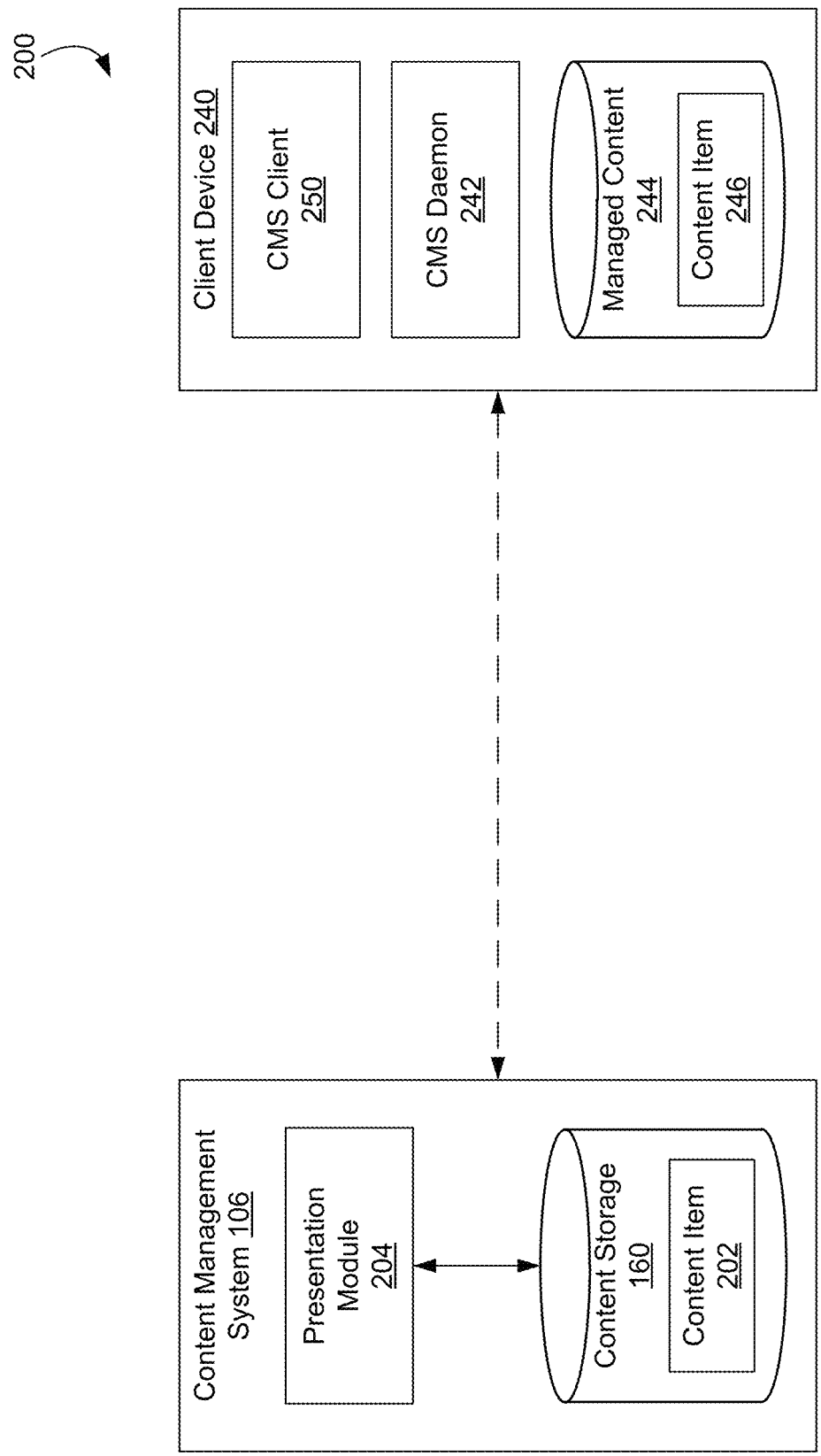
FIG. 2 is a block diagram of an example system for automatically formatting content items for presentation.

FIG. 2 is a block diagram of an example system 200 for automatically formatting content items for presentation. For example, system 200 can correspond to system 100 of FIG. 1A.

In some implementations, system 200 can include client device 240. For example, client device 240 can correspond to client device 102$_i$ described above with reference to FIG. 1A. Client device 240 can be a computing device (e.g., hardware and/or software), such as a laptop computer, desktop computer, tablet computer, smartphone, wearable device or other type of computing device.

In some implementations, client device 240 can include content management system (CMS) daemon 242. For example, CMS daemon 242 can be a background software process (e.g., part of the operating system, standalone process, etc.) that manages, in coordination with content management system 106, synchronization of content items in managed content 244 with content items in content storage 160 managed by content management system 106, as described above.

In some implementations, client device 240 can include content management system (CMS) client 250. For example, CMS client 250 can be a native application of client device 240. For example, a native software application can be an application that is built specifically for the hardware and/or software configuration of client device 240. Thus, the graphical user interfaces (and other functionality) of CMS client 250 described below can be implemented using instructions, application programming interfaces (APIs), and other technologies native to client device 240. To generate the various graphical user interfaces below and/or implement various features described herein, CMS client 250 can request data (e.g., content items, notifications, etc.) from content management system 106 (e.g., user interface module 122) over a network connection (e.g., through network 104). Content management system 106 can obtain data from content storage 160 and/or other modules of content management system 106 and send the data to CMS client 250. CMS client 250 can then present the data on various graphical user interfaces generated by CMS client 250.

Alternatively, CMS client 250 can be a web client executed by a web browser running on client device 240. Thus, the graphical user interfaces (and other functionality) of CMS client 250 can be implemented using instructions, APIs, and other technologies that are not native to client device 240. For example, CMS client 250 can be built as a web application using non-native web code or instructions (e.g., HTML, JavaScript, etc.). Content management system 106 can serve CMS client 250 to a web browser on client device 240 and the web browser can execute CMS client 250 to present the graphical user interfaces (and other functionality) to the user, as described in detail below. To generate the various graphical user interfaces below and/or implement various features described herein, CMS client 250 (e.g., the web browser) can request various data views (e.g., graphical user interfaces, web pages, etc.) from content management system 106. Content management system 106 can generate the data views (e.g., the graphical user interfaces described below) for presenting content management system data (e.g., content items, notifications, comments, tasks, etc.) and send the data views to CMS client 250 over a network connection (e.g., through network 104). For example, content management system 106 can obtain data from content storage 160 and/or software modules of content management system 106, generate the data views based on the data, and send the data views to CMS client 250.

In some implementations, content management system 106 can include presentation module 204. Presentation module 204 can be configured to format non-presentation content items so that the content items can be more effectively presented, such as on a large format display (e.g., projector, large monitor, etc.). Moreover, presentation module 204 can automatically and intelligently determine how to break up a content item and generate portions of content (e.g., slides) for presentation based on the content item such that the portions of content are appropriately formatted and include or accentuate interesting content from the content item, as described further below. For example, a user of client device 240 can interact with CMS client 250 to collaborate with other users on content item 202 stored in content storage 160 on content management system 106. The user may provide input to CMS client 250 to invoke a presentation mode for content item 202. CMS client 250 may send a request to content management system 106 to invoke the presentation mode for content item 202. In response to receiving the request, content management system 106 can invoke presentation module 204 to automatically format content item 202 for presentation in a particular display area. For example, the user can select, through CMS client 250, a display (e.g., projector, monitor, etc.) for presenting content item 202. Presentation module 204 can then format content item 202 and select portions of content to present according to the characteristics (e.g., dimensions, resolution, screen size, window size, etc.) of the display area.

While FIG. 2 shows presentation module 204 as part of content management system 106, presentation module 204 can be included in CMS client 250. Thus, if client device 240 is offline (e.g., not connected to content management system 106), CMS client 250 can present content item 246 according to the features and/or mechanisms described herein.

In some implementations, content item 202 can include indicia of importance that can be used to identify interesting or important portions of content item 202. For example, the indicia of importance can be found in content item 202 and/or metadata associated with content item 202. The indicia of importance can be user defined and/or automatically determined by content management system 106. The indicia of importance can be based on whether content includes comments with respect to portions of content item 202. For example, if a portion of a content item is associated with a user comment, then the content management system 106 can determine that the portion of the content item is important. The indicia of importance can be based on whether the content includes links to another content item.

The indicia of importance can be based on a revision history indicating that a portion of content item 202 was heavily edited. The indicia of importance can be based on whether the content includes infrequently used words or phrasing within a portion of content that may indicate a new topic, idea, or subject matter. The indicia of importance can be based on an access history indicating whether users have lingered over portions of content while reviewing the content. For example, if a user spends a long time reviewing a specific portion of content item 202, then the specific portion may be important or interesting and should be highlighted when presenting content item 202. The indicia of importance can be used by presentation module 204 to filter out and/or highlight portions of content in content item 202 when formatting content item 202 for presentation.

Figure 3:
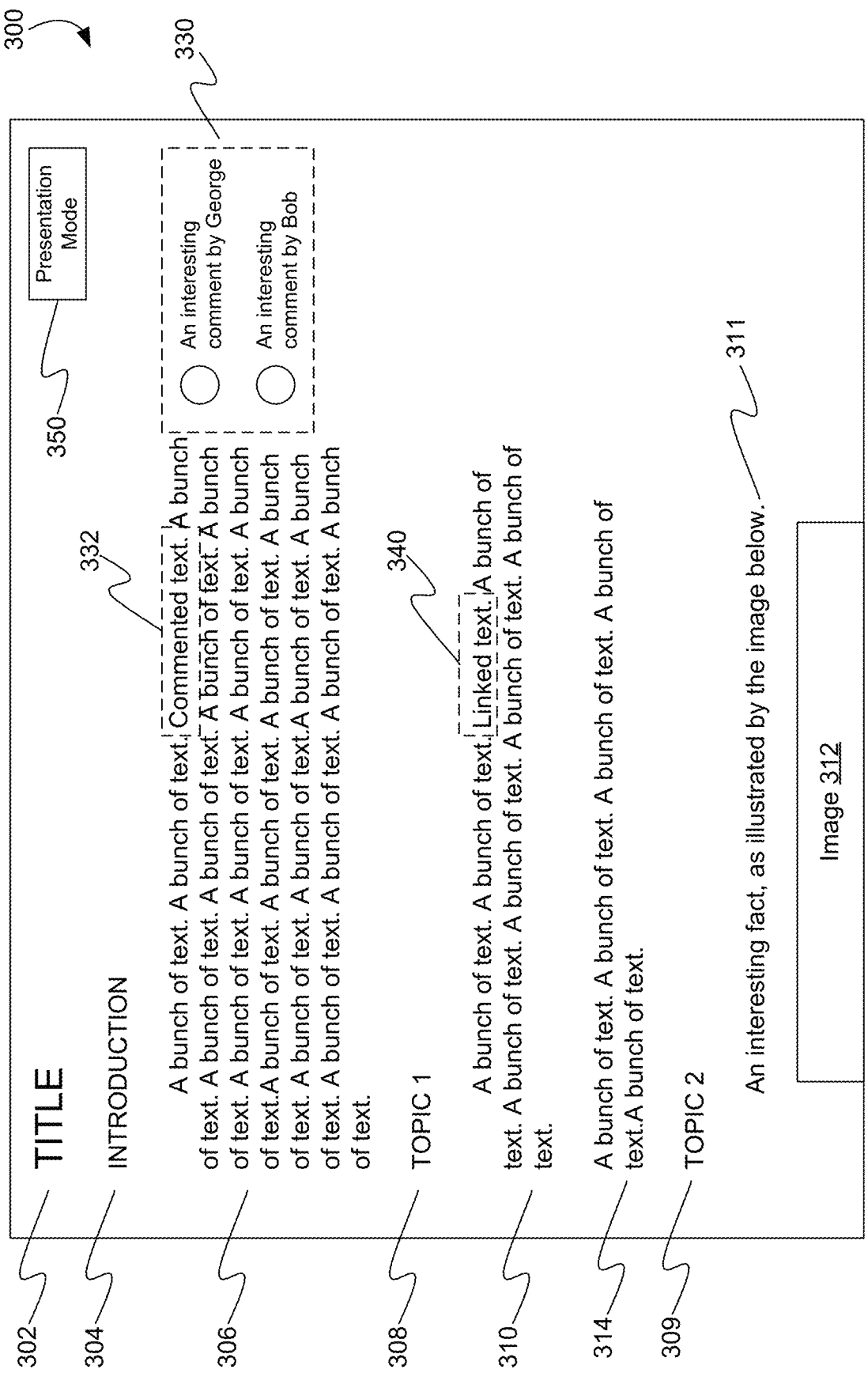
FIG. 3 illustrates an example graphical user interface of a content management system client presenting content of a content item.

FIG. 3 illustrates an example graphical user interface 300 of CMS client 250 presenting content of content item 202. For example, the user of client device 240 can invoke CMS client 250 and select content item 202 to view the contents of content item 202 on GUI 300 on a display of client device 240.

In some implementations, content item 202 can include various structural elements that can be used to generate a presentation view of content item 202. For example, content item 202 can include a title 302. Content item 202 can include headers 304 and/or 308 that correspond to and/or delineate sections, topics, subtopics and/or other portions of content item 202. Content item 202 can include various levels of headers. For example, title 302 can be considered a top-level header, while headers 304 and/or 308 can be considered lower-level headers. Each header can provide a word or phrase that summarizes the subject matter of the text, paragraphs (e.g., paragraphs 306, 310, etc.), graphics (e.g., image 312), etc. that follow the header.

In some implementations, content item 202 can have corresponding metadata that specifies an indicia of importance value associated with various portions of content item 202. For example, this indicia of importance value can be based on whether a section of content includes comments 330 associated with content (e.g., content 332) in content item 202. Comments 330 can be indicia of importance since one or more users (e.g., collaborators) have determined that the content on which the comment is attached or associated (e.g., content 332) was important enough or interesting enough to comment upon. Similarly, indicia of importance can include links to other content (e.g., content 340 is a link to other content) in content item 202. For example, when a user creates a link that refers to other content, content management system 106 can determine that the portion of content with a link is important or interesting since the link may provide additional information on an important topic in the content item. For example, a user adding a link to a content item can signify that the linking content (e.g., linked text 340) and/or the content around it are important.

Additionally, and as described above, indicia of importance can include edit history data. For example, the metadata for content item 202 can include revision history information describing which portions of content item 202 have received greater or fewer edits. Portions of content item 202 that received a greater number of edits can be considered more important or more interesting than other portions of content item 202 that received fewer edits since greater care was taken or attention given by the editing users to the heavily edited portions. Similarly, portions of content item 202 that were recently edited may be deemed more important than portions of content item 202 that were edited less recently. For example, the user may want to present or share recently made edits with colleagues or other users.

Further, indicia of importance can include the amount of time a user or multiple users view or linger on a portion of content in content item 202. For example, content management system 106 and/or CMS client 250 can monitor the amount of time a user or multiple users view various portions of content item 202 and store a mapping of the "linger time" to content portions in metadata associated with content item 202. The linger time can be determined based on the amount of time the portion of content is presented to the user (e.g., shown on a display) in an active window. The linger time can be cumulative over the life of the content item or just represent the linger time associated with the most recent viewing. Presentation module 204 can then use the "linger time" to determine which portions of content item 202 are important or interesting and which are not. For example, presentation module 204 can determine that portions of content item 202 having larger linger times are more important than portions of content item 202 having smaller linger times.

Indicia of importance can be stored in relation to portions of content in various forms. For example, a Boolean value can indicate whether a portion of content is or is not important. In some cases, a level of importance can be assigned to a portion of content. The level of importance can be based on which indicia of importance are present for a portion of content and/or how intensely an indication of importance is present. For example, an importance value can be computed based on weighted values corresponding to whether each of various indicia of importance are present. The weighting can be established for different types of importance indicia. The weighting values can also be adjusted based on how intensely an indication of importance is present. For example, an amount of time a user or multiple users view or linger on a portion of content can be translated into a corresponding value to weight that importance indicator.

In some implementations, GUI 300 can include graphical element 350 for invoking presentation mode for content item 202. In some embodiments, once a user invokes presentation mode, presentation module 204 can generate one or more presentation views (e.g., a slide or slides) of content item 202. For example, to generate the presentation view, presentation module 204 can generate a tree (e.g., a branching data structure of nodes) representing the structure of content item 202 and/or portions of content corresponding to indicia of importance, generate a presentation version of content item 202 (e.g. a version of the content item with styles applied for presenting the content item in a presentation), and dynamically generate one or more presentation views (e.g. slides) based on the presentation version of content item 202, the tree structure and/or characteristics of a display area that will show presentation views of the content item 202.

In some implementations, presentation module 204 can generate a presentation version of content item 202. For example, when presentation mode is invoked by the user, presentation module 204 can create (e.g., in memory) a presentation version of content item 202 based on a presentation template (e.g., style sheet) that defines fonts, font sizes, structural layout, and other aesthetic features of content item 202. In particular, the presentation template can define the sizes and spacing of the content in content item 202 appropriate for presenting the content of content item 202 in a large format display area.

In some embodiments, when a user invokes presentation mode, presentation module 204 can obtain an already generated presentation view of content item 202. For example, content management system 106 can store presentation views associated with different versions of a content item. When the user invokes the presentation mode for a content item, content management system 106 can determine whether the version of the content item to be presented corresponds to the version of the content item represented by stored presentation views. If the versions are the same, then, content management system 106 can provide the stored presentation views to CMS client 250 for presentation by the selected display.

Figure 4:
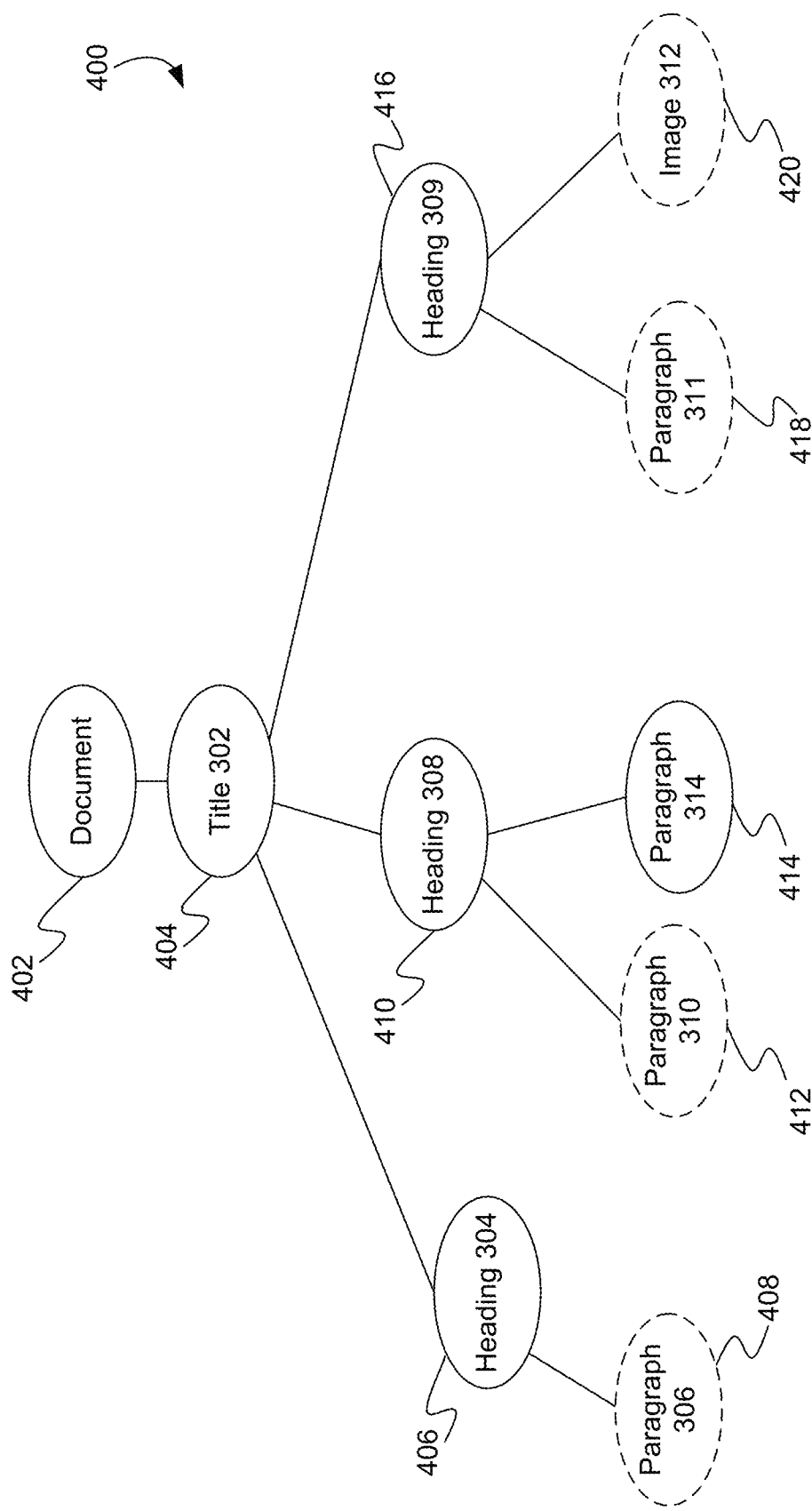
FIG. 4 illustrates an example tree structure for generating a presentation view for a content item.

FIG. 4 illustrates an example tree structure 400 for generating a presentation view for a content item. Presentation module 204 can generate tree structure 400 in response to the user selecting to display content item 202 in presentation mode. Presentation module 204 can generate tree 400 based on the hierarchical elements (e.g., title, headers, sub-headers, paragraphs, etc.) of the content in content item 202, for example. Thus, in some implementations, each node within tree 400 can correspond to a structural element of content item 202. For example, tree 400 can include a document node 402 (for all of content item 202), title node 404 (for title 302), and header nodes 406 (for header 304), 410 (for header 308) and 416 (for header 309). Additionally, tree 400 can include leaf nodes 408 (for paragraph 306), 412 (for paragraph 310), 414 (for paragraph 314), 418 (for paragraph 311), and/or 420 (for image 312). Leaf nodes can also correspond to other low level document elements, such as bullets, tables, images (e.g., image 312), and the like. In some implementations, the hierarchy can include relationships between the low level document elements, providing for nodes corresponding to low level document elements to not be leaf nodes. For example, the hierarchical relationship can be established based on levels in lists or bullets, paragraphs can be organized based on indentation level, tables can have additional content within individual cells, etc. Additional details regarding generating a tree structure corresponding to a content item are provided below in relation to FIG. 10B.

In some implementations, certain types of content can be flagged for exclusion from the presentation views, unless associated with an indicia of importance value above a threshold level, as described below. Such content to exclude is indicated in FIG. 4 by dashed lines, e.g. around nodes 408, 412, 418, 420, and 422. In various implementations, types of content to exclude can include text segments with a length above a threshold, images or images above or below a threshold size, comments or other annotations, etc.

In some implementations, presentation module 204 can generate a presentation view showing a portion of content from content item 202 based on tree structure 400 and a presentation version. For example, presentation module 204 can perform a pre-order traversal of tree 400, analyze each node to determine whether the content in the presentation version associated with each node (e.g., candidate node) and its children nodes (e.g., collectively "candidate node subtree") can fit on the selected presentation display. Presentation module 204 can create a presentation view based on a candidate node subtree when the content corresponding to the candidate node subtree will fit in the presentation display area.

In some embodiments, presentation module 204 can generate presentation views for content item 202 upon receiving the presentation mode invocation. For example, presentation module 204 can generate each presentation view dynamically (e.g., on demand, as needed, etc.) as the user navigates through content item 202. Presentation module 204 can generate all presentation views for content item 202 in response to receiving the presentation mode invocation. Presentation module 204 can traverse tree 400 generating presentation views for different portions of content item 202 based on the display size of the selected display.

Figure 5:
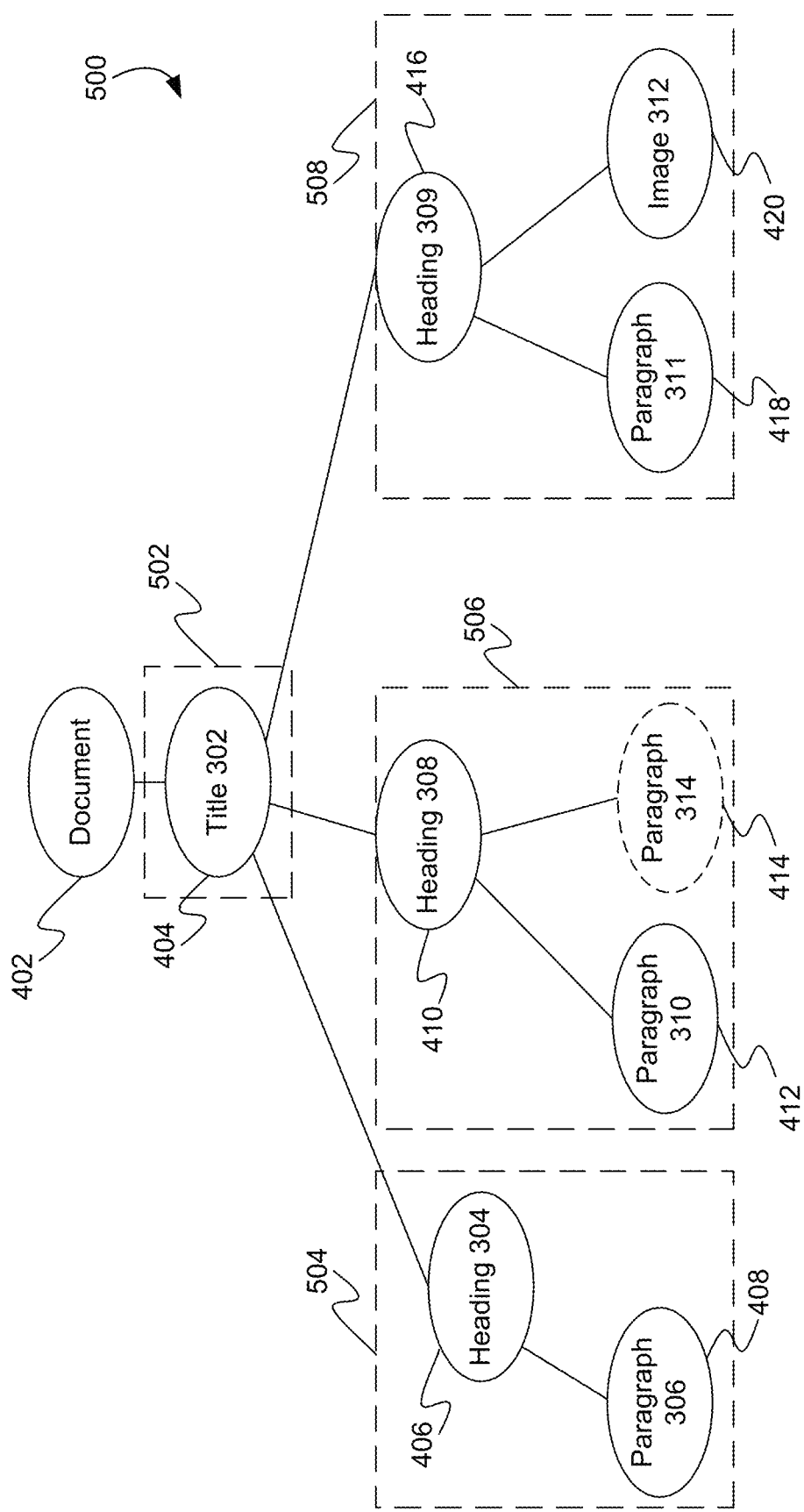
FIG. 5 illustrates an example showing how nodes in a tree structure can be grouped, based on a presentation version, to select content for presentation views.

In some implementations, presentation module 204 can determine content, from the presentation version, to include in various presentation views corresponding to subtrees of tree 400. FIG. 5 shows subtrees 502, 504, 506, and 508 corresponding to presentation views 600, 700, 800, and 900, respectively. As discussed in the following section, these subtrees can be determined by selecting content, from the presentation version, that will fit within a display area. Groupings 502-508 are shown to demonstrate correspondence between nodes of tree 400 and presentation views 600-900. While, in some implementations, presentation module 204 can explicitly define groupings 502-508, in other implementations these groupings are determined by virtue of selecting, in an order defined by tree 400, content for presentation views.

In the example shown in FIGS. 3-9, presentation module 204 can start with node 404 (e.g., title node, used as the first candidate node) and can follow a pre-order traversal of tree 400. Presentation module 204 can determine whether node 404 and each of the child nodes of node 404 (e.g., the entire content of content item 202 as formatted in the presentation version) will fit on the selected presentation display. If the content from the presentation version corresponding to the entire candidate node subtree can fit within the selected presentation display area, then presentation module 204 can generate a presentation view that includes the content corresponding to the entire candidate node subtree. In this example, the presentation version content corresponding to the candidate node subtree (e.g., node 404 and its subtree) does not fit within the selected presentation display area, so presentation module 204 can generate a presentation view that includes only the current candidate node (e.g. the portion of the candidate node subtree that can fit within the presentation display area). As described below, during the traversal of tree 400, the portion of the candidate node subtree selected for inclusion, can be based on various rules.

After determining a portion of the candidate node subtree for inclusion in a presentation view, presentation module 204 can analyze the next candidate node in tree 400 to determine whether the candidate node subtree can fit within a presentation view. For example, after analyzing node 404 and determining that the subtree starting at node 404 does not fit within the presentation view, presentation module 204 can determine that the first presentation view, e.g. group 502, should include only node 404 (e.g., the title of content item 202).

Presentation module 204 can then move to the next candidate node (e.g., node 406) following pre-order traversal, and analyze the subtree starting at node 406 (e.g., nodes 406, 408) for fit in the next presentation view. Thus, presentation module 204 can generate the presentation views (e.g. slides) for content item 202 by iteratively analyzing candidate node subtrees of tree 400 and breaking down tree 400 into smaller and smaller subtrees until presentation module 204 determines subtrees and/or individual nodes that have corresponding content that can fit within the selected presentation view area. In this example, as presentation module 204 traverses tree 400, it determines that each of subtrees 502, 504, 506 and 508 corresponds to content in the presentation version that fit within a presentation view.

As presentation module 204 traverses tree 400, generating presentation views based on candidate node subtrees, presentation module 204 can group portions of content item 202 corresponding to the nodes of tree 400 based on various rules. In one example rule, presentation module 204 can group portions of content (e.g., nodes) by specifying that at least the first leaf node (e.g., node 412) in a group of nodes (e.g., nodes 410, 412, 414) having the same parent node (e.g., node 412) is included in the same presentation view as the parent node 410.

In another example rule, presentation module 204 can group portions of content by specifying that a non-first child node (e.g., node 420) is included in a presentation view when the non-first child node and all earlier child nodes (e.g., node 418) fit in the same presentation view.

In another example rule, when the candidate node (e.g. node 404) has no child leaf nodes and the entire subtree for the candidate node does not fit within the presentation view area, presentation module 204 can generate a presentation view that includes only the content corresponding to the candidate node (e.g. based on subtree 502) and then select the next candidate node (e.g. node 406) for the fit analysis according to preorder traversal. In other words, as the tree structure is traversed in the preorder traversal, nodes can be included in the subtree until a node is reached that corresponds to content in the presentation version that, with content in the presentation version corresponding to the other nodes in subtree, does not fit in a display area for the presentation view. However, when the candidate node has at least one child leaf node and the entire subtree for the candidate node does not fit within the display area for the presentation view, presentation module 204 can group in the subtree the candidate node with at least one child leaf node.

Moreover, since the pre-order traversal would cause presentation module 204 to visit child nodes (e.g., nodes 412, 414) of a parent node (e.g., node 410) before visiting parent sibling nodes (e.g., node 416) when determining fit, presentation module 204 will present portions of content corresponding to child nodes (e.g., paragraphs) with parent nodes (e.g., heading) in the same presentation view rather than presenting unrelated child nodes (e.g., having different parent nodes) in the same presentation view. Thus, paragraphs from different sections will not be presented together in presentation view unless the headings for the sections are also included in the presentation view.

To determine whether content corresponding to a candidate node subtree will fit within a presentation view or presentation view area, presentation module 204 can obtain the dimensions and other characteristics of the display area of the presentation display selected by the user from content management system 106. For example, the dimensions of the display area can be received from client device 240 when the user selects to view content item 202 in presentation mode, as described above. Presentation module 204 can also determine the amount of presentation space the content corresponding to each of the candidate nodes (e.g., title node 404 and children nodes) requires. For example, if, based on the formatting of the presentation version of content item 202, the content corresponding to the candidate node subtree requires less than some threshold (e.g., 80%, 60%, etc.) of the display area of the presentation display, then presentation module 204 can generate a presentation view (e.g., slide) that includes the content associated with the candidate node subtree.

Figure 6:
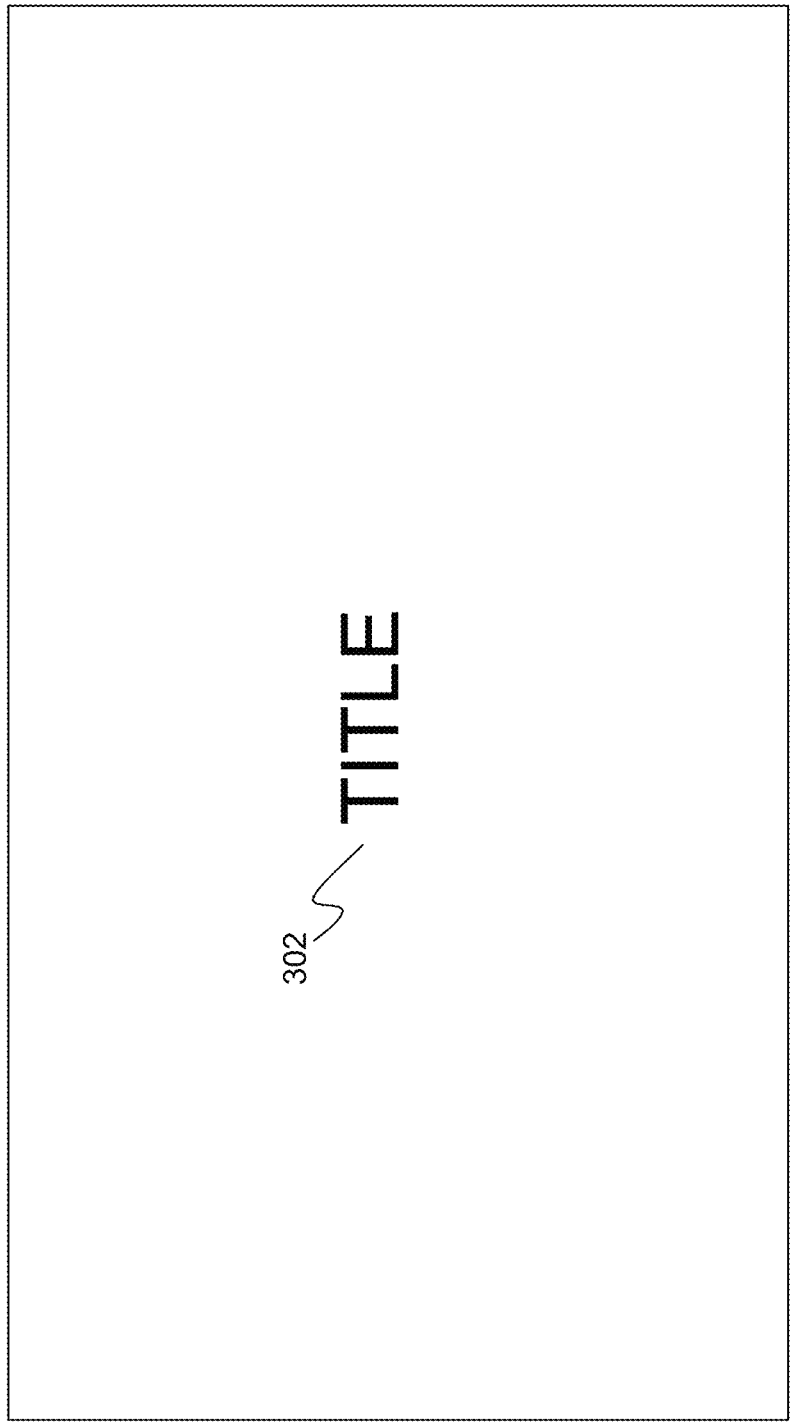
FIG. 6 illustrates an example presentation view generated based on a tree structure.

However, if, based on the formatting of the presentation version of content item 202, the content corresponding to the candidate node subtree requires some threshold (e.g., 100%, 80%, 60%, etc.) of the presentation display area, then presentation module 204 can generate a presentation view that includes only the content of the candidate node (e.g., corresponding to subtree 502, as illustrated by presentation view 600 of FIG. 6) or a portion of the candidate node subtree (e.g., the candidate node and first child leaf node). After generating the presentation view for the current candidate node (or candidate node subtree), presentation module 204 can move to the next candidate node in tree 400 and analyze the candidate node subtree for fit, as described above. For example, the next candidate node can correspond to the next node reached according to pre-order traversal of tree 400 that has not already been included in a presentation view. Thus, presentation module 204 can dynamically determine the content for each presentation view based on the amount of content associated with each candidate node and/or candidate node subtree.

In some implementations, presentation module 204 can analyze the first candidate node 404 (e.g., title node) and determine that the content corresponding to the candidate node subtree cannot fit within the presentation view area. Thus, presentation module 204 can generate the first presentation view 600 including only the title corresponding to node 404 and subtree 502, and move on to the next candidate node 406.

Presentation module 204 selects node 406 as the next candidate node because node 406 is the next node reached when performing pre-order traversal of tree 400 and because node 406 has not yet been included in a presentation view. At candidate node 406, presentation module 204 can determine whether the content associated with the candidate node subtree (e.g., node 406 and all child nodes) will fit in the presentation display area. As described above, presentation module 204 can determine that the content will fit in the presentation display area when the corresponding presentation version content will fill less than a threshold percentage of the presentation display area. In this example, the content in the presentation version corresponding to heading 304 and paragraph 306 can fit within the display area, thus subtree 504 includes these two nodes.

According to a rule, the content corresponding to the next pre-order traversal node 410 has a first leaf node 412, and thus heading 308 should be grouped with paragraph 412 if they both fit in the display area. The group of heading 308 and paragraph 310, as formatted in the display presentation, do not fit in the display area with the content of heading 304 and paragraph 306 form the presentation version. Thus, subtree 504 is complete, corresponding to presentation view 700.

After designating subtree 504 and/or generating the presentation view 700, presentation module 204 can move to the next candidate node (node 410) according to pre-order traversal of tree 400. In a similar manner, presentation module 204 can then identify a subtree (e.g., subtree 506) or generate a presentation view (e.g. presentation view 800) for this candidate node 410. Finally, presentation module 204 can then move to the next candidate node (node 416) identify a subtree (e.g., subtree 508) or generate a presentation view (e.g. presentation view 900) for this candidate node 416.

In some implementations, if the content associated with a single node (e.g., node 408) cannot fit within a presentation view area, then presentation module 204 can divide the content associated with the single node among multiple presentation views. Alternatively, when the content associated with a single node (e.g., node 408) cannot fit within a presentation view area, presentation module 204 can summarize the content associated with the single node and generate a presentation view based on the summarized content. For example, presentation module 204 can generate a summary of the content associated with the single node by including, in the presentation view, only the content associated with an indicia of importance flag or an indicia of importance value above a threshold. Alternatively, presentation module 204 can perform semantic analysis to determine which portions of the content corresponding to the single node are most important or most descriptive of the content.

In some implementations, presentation module 204 can split content such as paragraphs, lists, tables, etc., into different presentation views. For example, when presentation module 204 attempts to include content such as a paragraph, list, table, etc., in a presentation view but the content is too long for the presentation display size, presentation module 204 can split the content according to the presentation display size and generate multiple presentation views to present the resulting content portions. CMS client 250 can then present the multiple views to the user as the user navigates through content item 202, as described above. Thus, content associated with a single leaf node can be used to generate multiple presentation views (e.g., slides) when the corresponding content is too big for single presentation view.

FIG. 6 illustrates an example presentation view 600 generated based on subtree 502 of tree structure 400. Presentation view 600 can be generated by presentation module 204 and presented by CMS client 250, as described above. Presentation view 600 can include title 302.

Figure 7:
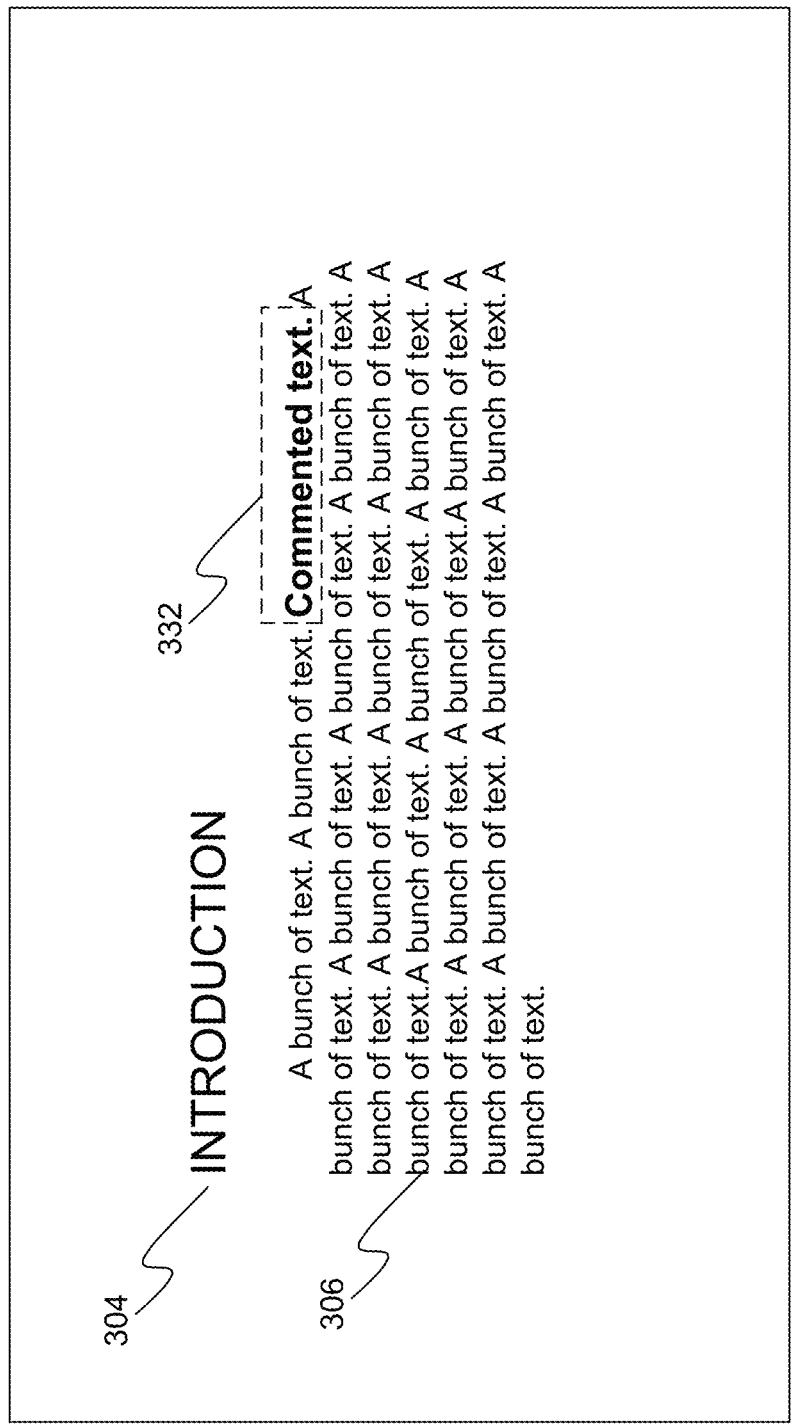
FIG. 7 illustrates an example presentation view generated based on a tree structure.

FIG. 7 illustrates an example presentation view 700 generated based on subtree 504 of tree structure 400. Presentation view 700 can be generated by presentation module 204 and presented by CMS client 250, as described above. Presentation view 700 can include header 304 and paragraph 306.

Figure 8:
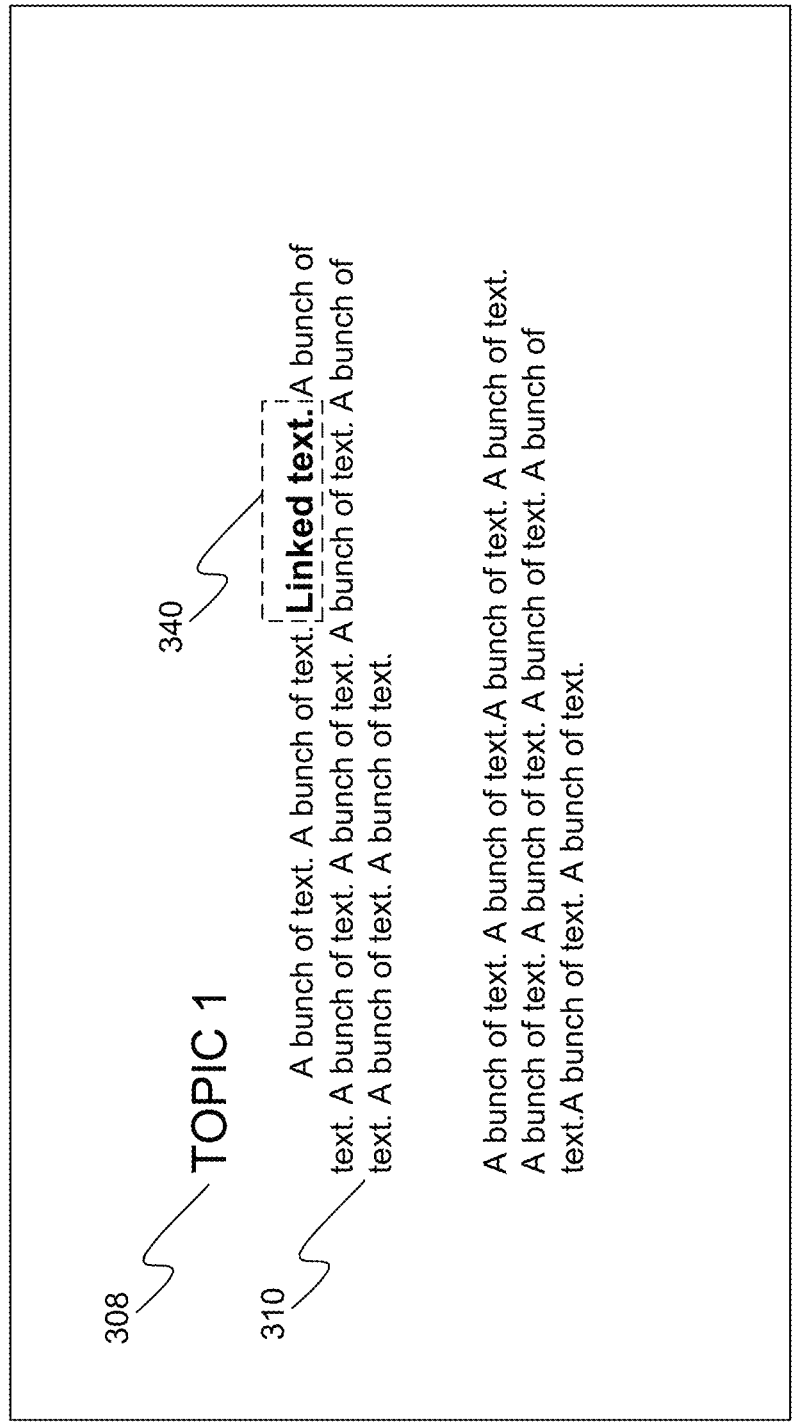
FIG. 8 illustrates an example presentation view generated based on a tree structure.

FIG. 8 illustrates an example presentation view 800 generated based on subtree 506 of tree structure 400. Presentation view 800 can be generated by presentation module 204 and presented by CMS client 250, as described above. Presentation view 800 can include header 308, paragraph 310, and paragraph 314.

Figure 9:
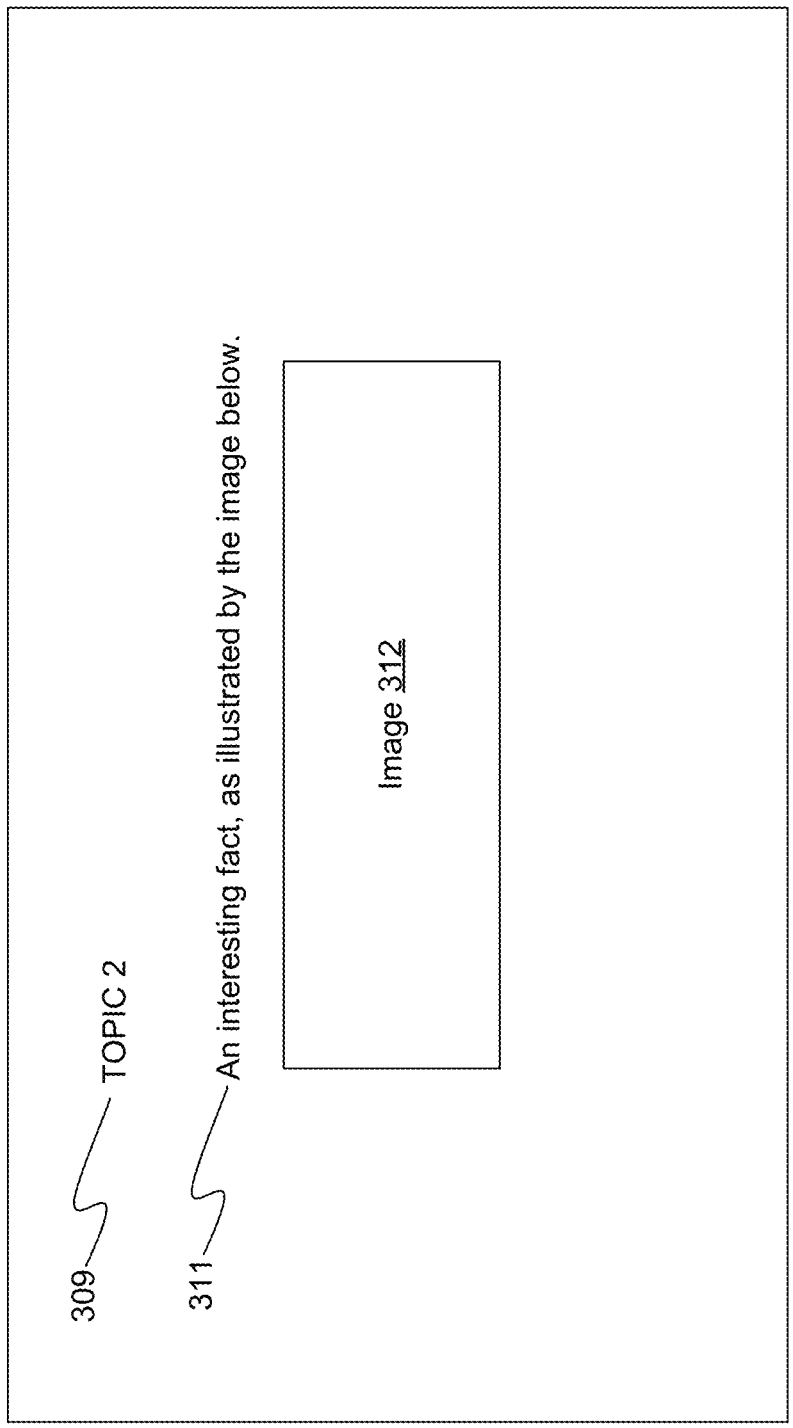
FIG. 9 illustrates an example presentation view generated based on a tree structure.

FIG. 9 illustrates an example presentation view 900 generated based on subtree 508 of tree structure 400. Presentation view 900 can be generated by presentation module 204 and presented by CMS client 250, as described above. Presentation view 900 can include header 309, paragraph 311, and image 312.

The content included in each of presentation views 600, 700, 800, and 900 can be formatted and arranged according to how the content appears in the presentation version. In some implementations, each of presentation views 600, 700, 800, and 900 can be taken directly from the presentation version. For example, generating each presentation view can be performed by defining a top and bottom bound for a window into the presentation version.

After generating the presentation views for the selected content item 202 based on tree 400 and the presentation version of content item 202, presentation module 204 can send the presentation views to CMS client 250. For example, presentation module 204 can send all of the presentation views generated for content item 202 to CMS client 250 in response to receiving the invocation of the presentation mode for content item 202. Alternatively, presentation module 204 can send individual presentation views to CMS client 250 as needed in response to receiving presentation view navigation instructions from CMS client 250. For example, while viewing a current presentation view (e.g., slide) for content item 202, the user can provide navigational input (e.g., keyboard arrow up, arrow down, swipe up, swipe down, scroll wheel input, etc.) to CMS client 250 to indicate the that the user would like to view the next or previous presentation view (e.g., slide) associated with content item 202. CMS client 250 can send navigational instructions corresponding to the user's input to presentation module 204 to cause presentation module 204 to send the next or previous presentation view for content item 202 to CMS client 250.

In some implementations, the user can provide input to cause CMS client 250 to scroll through content item 202. The scrolling input can cause CMS client 250 to exit presentation mode. This can allow the user to quickly scroll through the content of content item 202 to identify a next portion of content to present. For example, when the system receives a scrolling command in presentation mode, it can revert the display of content item 202 back to the normal content item editor view while scrolling and present normal content item scrolling behavior to the user. When the user stops scrolling (e.g., the user has found content the user is interested in), presentation module 204 can automatically transition back to presentation mode to present the content corresponding to the current location in content item 202. CMS client 250 can, for example, send a message indicating the location in content item 202 where the user stopped scrolling (e.g., the current location) to presentation module 204. Presentation module 204 can determine which node in tree 400 corresponds to the current location and send a presentation view for the content at the current location to CMS client 250.

In some implementations, CMS client 250 can generate the presentation views for content item 202. For example, content management system 106 can generate the tree structure 400 and/or the presentation version for content item 202 and provide the tree structure 400 and presentation version of content item 202 to CMS client 250. When the user invokes the presentation mode for content item 202, CMS client 240 can generate the presentation view(s) for content item 202 based on the tree structure 400 and the presentation version of content item 202 generated by content management system 106. For example, content management system client 250 can generate a presentation view by displaying a particular portion of the presentation version, the portion selected based on a subtree, as discussed above.

In some implementations, presentation module 204 can generate multiple tree structures for a content item. For example, content item 202 can include content indicating a forced break (e.g., a page break, a horizontal rule, etc.) inserted into content item 202 by a user. When presentation module 204 parses content item 202 to generate a tree structure and detects the forced break, presentation module 204 can create an additional tree structure for content in content item 202 that follows the forced break. For example, the additional tree structure can be a subtree of document node 402.

In some implementations, presentation module 204 can use indicia of importance to determine what to include in a presentation view. Indicia of importance are features of content that can be used to assign levels of importance to the content associated with a tree node. Indicia of importance can cause content that, in various implementations, would otherwise be suppressed, abbreviated, or hidden, to be included in a presentation view.

In various implementations, indicia of importance can be manually assigned or can be automatically determined. For example, indicia of importance can be manually assigned by a user specifying specific content or types of content to include or exclude from a presentation view. As another example, indicia of importance can be automatically assigned based on rules. Indicia of importance rules can assign indicia of importance values to nodes in a tree, such as tree 400, based on factors such as the type of content corresponding to the node, determined subject-matter of the content, users viewing the content, edits made to the content, links related to the content, comments on the content, images or other media associated with the content, or other factors.

In some implementations, indicia of importance rules can assign a value to a tree node based on one or more identified types for the content corresponding to the node. For example, collaborative content items can include content types such as: various levels of headings, body level content, lists, tasks, images, tables, etc. In some implementations, content types can also include characteristics of content such as length (e.g., number of words or characters), size of a media item, or formatting (e.g., bold, underline, italic, etc.). An indicia of importance rule can establish a value for various types of content, which can be used to assign or update an indicia of importance value for a tree node that is associated with content of the corresponding type. For example, an indicia of importance rule can specify that dense paragraphs (e.g., paragraphs with above a threshold number of words or characters) should have an initial indicia of importance value of zero. In some implementations, presentation module 204 can assign or update an indicia of importance value based on content type proportions associated with the tree node. For example, a node can be associated with a body text and an image. The body text can have a first indicia of importance value and the image can have a second indicia of importance value. The indicia of importance value for the node can be a combination of these values. The combination can be weighted more heavily toward the image value because an indicia of importance rule can specify that images are more relevant to selecting content.

In some implementations, an indicia of importance value can be based on how many times or how long content corresponding to a node has been viewed. For example, a portion of content that users have spent a lot of time (e.g., above a threshold period of time) viewing can be considered important content. An indicia of importance value for a section of content based on viewing history can account for an amount of time since the views occurred, length of viewing time, or the number of distinct viewers of the section of content.

In some implementations, an indicia of importance value can be based on an edit history for content corresponding to a node. An edit history indicia of importance value can be based on how recently the content was edited, how often the content has been edited, and/or a number of users that have edited the content.

In some implementations, an indicia of importance value can be based on whether the content corresponding to a node is associated with references to other content (e.g., links). For example, since paragraph 310 includes link 340, an indicia of importance value associated with node 412 can be increased or more heavily weighted. In some implementations, indicia of importance rules can assign an indicia of importance value to a node based on whether the content is referenced by other content. For example, presentation module 204 can determine, for content corresponding to a particular node, a number of links in other collaborative content items that refer to that content. Presentation module 204 can adjust an indicia of importance value for the node based on this link count.

In some implementations, an indicia of importance value can be based on comments that are on the content corresponding to a node. In various implementations, a comment indicia of importance rule can account for a total amount of comments (e.g., initial comments and replies to initial comments); a number of comment threads; a number of initial comments with a first weight and a number of reply comments with a different weight; or a number of users that commentated on the content.

In some implementations, an indicia of importance value can be based on semantic analysis of the content corresponding to a node. For example, presentation module 204 can determine a subject for various collaborative content item sections such as the entire collaborative content item, the current presentation view group, or a particular area of content (e.g., a list, an area under a heading, a table, etc.). This determination can be based, for example, on high frequency words or phrases in the section, a title or heading for the section, emphasized words in the section, etc. Presentation module 204 can perform a similar analysis on the content associated with a tree node. An indicia of importance rule can assign a value to the tree node based on an amount of similarity between the subject for the section of content and the content associated with the tree node. This can occur, for example, by encoding the words or phrases representing each determined subject in a vector space and comparing the distance (e.g., cosign difference) between the encoded vectors.

In some implementations, presentation module 204 can apply an indicia of importance rule to determine a subject of media (e.g., image, video, audio, etc.). For example, a subject can be determined through object identification, manual tagging, or analysis of metadata. Presentation module 204 can then compare results of the media analysis to a subject determined for content corresponding to a node in the same presentation view group. This comparison, for example, can be performed using word matching, vector encoding, machine learning classification, etc. For example, presentation module 204 can select a first node corresponding to an image to be part of a presentation view group. Presentation module 204 can also select a second node with content that can fit in the presentation view group. This content can be a dense paragraph to which an indicia of importance rule has assigned an indicia of importance value below a threshold required to include the node in the presentation view group. However, the image in the content corresponding to the first node can have a "cars" tag based on object analysis on the image. The content corresponding to the second node can include the words "sedan" and "truck." Presentation module 204 can apply a semantic analysis indicia of importance rule to compare the image tag with these words. As a result, presentation module 204 can determine that the content corresponding to the second node is highly related to the media, and thus assign it a higher indicia of importance value. Based on this higher indicia of importance value, presentation module 204 can select the second node for inclusion in the presentation view group.

In some implementations, an indicia of importance value can be based on the content corresponding to the node being proximate to media. For example, text immediately above or below an image may be important for describing and/or providing context for the image. Thus, when assigning indicia of importance values, presentation module 204 can increase the value for content that is proximate to media. For example, paragraph 311 is immediately before image 312. Thus, node 418 corresponding to paragraph 311 can have a heightened indicia of importance value.

Once the indicia of importance rules are applied to compute values, these indicia of importance values can be associated with nodes and used to determine which nodes to include in presentation view groupings. For example, each node 408, 414, and 418 can include a value that indicates whether the corresponding node has important content. Presentation module 204 can then select whether these nodes should be included in the tree or in a particular group based on whether their indicia of importance value for the node is above a threshold.

As described above, node 408 corresponds to paragraph 306 of content item 202. In this example, the indicia of importance rules define that dense paragraphs (in this case paragraphs with above 40 words) should be given an initial indicia of importance value of zero. As a result, presentation module 204, which requires an indicia of importance value of at least four, may not include node 408 (paragraph 306) in presentation view groups. However, another rule in this example can specify that initial comments increase the indicia of importance value by three and each reply comment further increases the indicia of importance value by one. Paragraph 306 includes commented text 332 corresponding to comment 330, which has a comment and one reply. Thus, the indicia of importance for node 408 would be four, making it eligible for inclusion in a presentation view grouping.

In some implementations, indicia of importance values can be binary (e.g., represented by a flag). In these implementations, the indicia of importance value, if set to true for a node, will cause the corresponding content to be eligible for inclusion in a presentation view group. Stated differently, presentation module 204 can include content corresponding to nodes that might otherwise be suppressed when the indicia of importance value is set, indicating the corresponding content matched a rule specifying the content should be included in presentation views. For example, referring to FIG. 7, paragraph 306 can be included in presentation view 700 because, despite being a dense paragraph, paragraph 306 includes content associated with at least one indicia of importance (e.g., commented content 332).

In some implementations, presentation views can highlight the content that matched an indicia of importance rule. For example, in presentation view 700, commented text 332 can be highlighted (e.g., larger font, bold font, different color, etc.). Thus, a viewer can quickly identify the reason why particular content, such as paragraph 306, is included in a presentation view. In these implementations, a node can be associated with both an indicia of importance value and an identification of the portion(s) of the corresponding content that matched an indicia of importance rule. This allows presentation module 204 to determine which portion of content corresponding to a node to highlight.

The following paragraphs describe processes performed by various computing devices for automatically formatting content items for presentation. While the processes described below describe specific steps performed in a particular order, the steps of the processes may be performed in a different order and/or with fewer steps and still produce the same or similar result. For example, some steps may be omitted and other steps may be rearranged without departing from the scope of the disclosure.

Figure 10A:
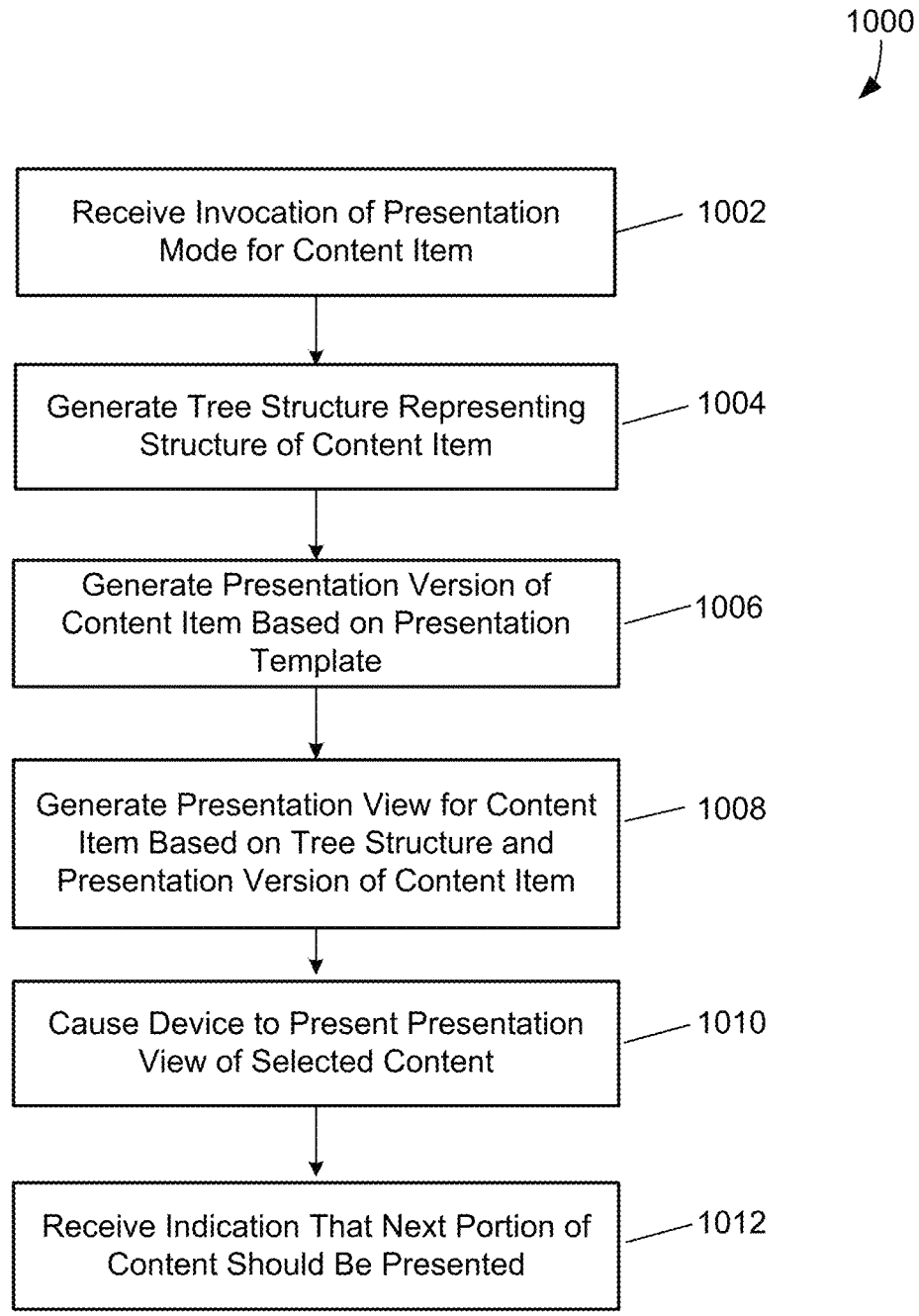
FIG. 10A is a flow diagram of an example process for automatically formatting content items for presentation.

FIG. 10A is a flow diagram of an example process 1000 for automatically formatting content items for presentation. In some implementations, process 1000 can be performed by server device (e.g., computing device) of content management system 106 to automatically format content item 202 for presentation by client device 240. In some implementations, process 1000 can be performed by client device 240 (e.g., computing device) to automatically format content item 246 for presentation by client device 240.

At step 1002, a computing device can receive an invocation of presentation mode for a content item. For example, a user can invoke CMS client 250 and select a content item (e.g., content item 202, content item 246, etc.) to view on a graphical user interface of CMS client 250. The user can select a graphical element presented on the graphical user interface to invoke a presentation mode for viewing and/or displaying the selected content item. In some implementations, CMS client 250 can send a message to content management system 106 indicating that the user has selected to invoke presentation mode for the content item.

At step 1004, the computing device can generate a tree structure representing the structure and/or interesting content of the selected content item. For example, presentation module 204 can parse the content item to determine the structural elements (e.g., title, headers, paragraphs, images, etc.) of the selected content item. The computing device can generate a tree structure where the nodes of the tree represent each structural element and/or interesting content of the selected content item. Generating a tree structure representing the content item is discussed in greater detail below with reference to FIG. 10B.

At step 1006, the computing device can generate a presentation version of the selected content item based on a presentation template. For example, the presentation template can define the layout, format, fonts, font or other content sizes, arrangement, and/or organization of various portions of the selected content item to be used to generate the presentation view of the selected content item. In some implementations, the layout, format, font sizes, arrangement, and/or organization of various portions of the selected content item can be different from how they are presented in the source content item. In some implementations, content included in the presentation version can be modified from the version in the content item, such as by automatic summarization, excluding certain types of content such as comments or portions of text above a threshold length, resizing images, converting images to thumbnails, etc. Presentation module 204 can generate the presentation version of the content item by rendering the content item into memory based on the template or templates. Generating a presentation version corresponding to the content item is discussed in greater detail below with reference to FIG. 10C.

At step 1008, the computing device can select a portion of the content item to include in a presentation view based on the tree structure and the presentation version of the content item. For example, the computing device can determine a subtree of the tree structure corresponding to content in the presentation version of the content item, based on characteristics a selected presentation display to use in a presentation view. Generating a presentation view based on the tree structure and presentation version is discussed in greater detail below with reference to FIG. 10D.

At step 1010, the computing device can cause a client device to present the presentation view of the selected content. For example, when a content management system server generates the presentation view, the content management system server can send the presentation view to the client device to cause the client device to present the presentation view. For example, the content management system server can send presentation views to the client one at a time and/or on demand as the user navigates through presentation views. The content management system server can send a plurality of presentation views representing the entire content item to the client device in response to receiving the invocation of the presentation mode for the content item. When the client device receives the presentation view, the client device can present the presentation view using the selected presentation display.

At step 1012, the computing device can receive an indication that a next portion of content should be presented. For example, CMS client 240 can receive input from the user indicating which portion of the selected content item should be presented next. For example, the input can indicate that a portion of content adjacent (e.g., previous or next portion) to the current portion of content should be presented. The input can indicate that a non-adjacent portion of content should be presented. For example, the presentation view may initially present a portion of the content item located at the beginning of the content item but, in response to user input scrolling to the end of the content item, the presentation view may present next a portion of the content item at the end of the content item thereby skipping middle portions of the content item. In some implementations, the input can indicate that no next portion of content should be presented. For example, the user can provide input exiting presentation mode. CMS client 240 can send instructions to content management system 106 to cause content management system 106 to send a presentation view corresponding to the next portion of content to CMS client 240. Content management system 106 can then determine whether there is more content to present from the content item and send the next presentation view to CMS client 240 for presentation on a display of the client device when the user has not yet reached the end of the content item.

In some implementations, presentation module 204 may generate only one presentation view at a time. For example, the presentation view can be dynamically generated as needed or on demand when a user navigates through the content item. In other implementations, presentation module 204 can generate all of the presentation views needed to present all of the content in the selected content item when presentation mode is invoked.

Figure 10B:
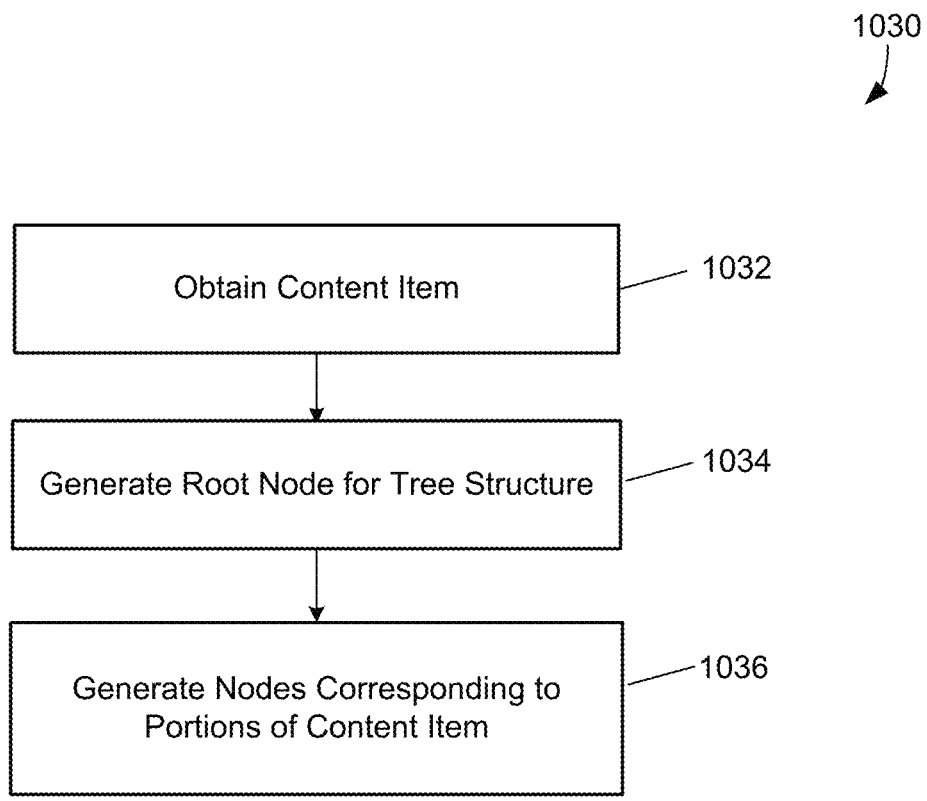
FIG. 10B is a flow diagram of an example process for generating a tree structure representing the structure of a content item.

FIG. 10B is a flow diagram of an example process 1030 for generating a tree structure representing the structure of a content item. For example, process 1030 can correspond to step 1004 of process 1000, described above.

At step 1032, the computing device can obtain a content item. For example, content management system 106 can obtain the content item corresponding to the content item at step 1002 above.

At step 1034, the computing device can generate a root node for a tree structure. For example, content management system 106 can create a tree structure representing portions of the content item. Content management system 106 can start the tree structure by generating a root node representing the content item.

At step 1036, the computing device can generate nodes corresponding to portions of the content item. For example, content management system 106 can parse the content item to determine the structure and/or content of the content item. Content management system 106 can then generate nodes, branches, etc. of the tree structure representing the content item based on various rules.

In some implementations, the rules for generating nodes can include identifying structural and/or style elements within the content item. In some implementations, nodes can be generated based on header designations. For example, a section of content that is tagged as a header can correspond to a node. As another example, a collaborative content item can be organized in a hierarchy, and a section below a header designation can correspond to a node. In some implementations, a collaborative content item can have a list (e.g., a bulleted hierarchy) and content can be grouped to correspond to nodes according to the list hierarchy. In some implementations, nodes can be generated based on tables or portions of tables in a collaborative content item. For example, nodes can be generated for table content that logically goes together (e.g., by grouping sequential portions such as by row or column). In some implementations, nodes can be generated by grouping sections of text that share formatting such as sections that are bold or underlined. In some implementations, nodes can be generated by grouping sections of text that use a particular grammar or language. For example, if a collaborative content item includes multiple languages, nodes can be generated from sections that include the same language. In some implementations, nodes can be generated according to punctuation. For example, nodes can correspond to sentences, paragraphs, sections of text between commas, items in a list following a colon, or etc.

In some implementations, the rules for generating nodes can include identifying sections of the content item that share a similar concept. For example, content management system can group content into a node based on similar words or phrases or other semantic analysis such as using machine learning semantic analysis or parts of speech tagging.

In some implementations, the rules for generating nodes can include selecting content that references the same multimedia item. For example, content management system 106 can group an image and textual content into a node when the textual content references the image.

In some implementations, the rules for generating nodes can include grouping content into a node based on an affinity between users. For example, content management system 106 can log a history of user interactions and contributions on other content items. For example, an affinity between users can be determined based on content sharing history. A portion of content in a content item can be grouped into a node such that content from users with an affinity can be associated with the same node.

In some implementations, content attribution, affiliation between users, or assigned user roles can be part of the basis for grouping content in a content item. For example, content from users identified as being in an Engineering user group can be put on the same slide or content attributed to a user identified as the content item owner can receive greater emphasis. In some implementations, the splitting or grouping content can include excluding or automatically summarizing some content. For example, paragraphs having a length greater than a threshold length can be excluded from the presentation views. Alternatively, paragraphs having a length greater than a threshold length can be summarized or otherwise shortened when added to a presentation version.

Figure 10C:
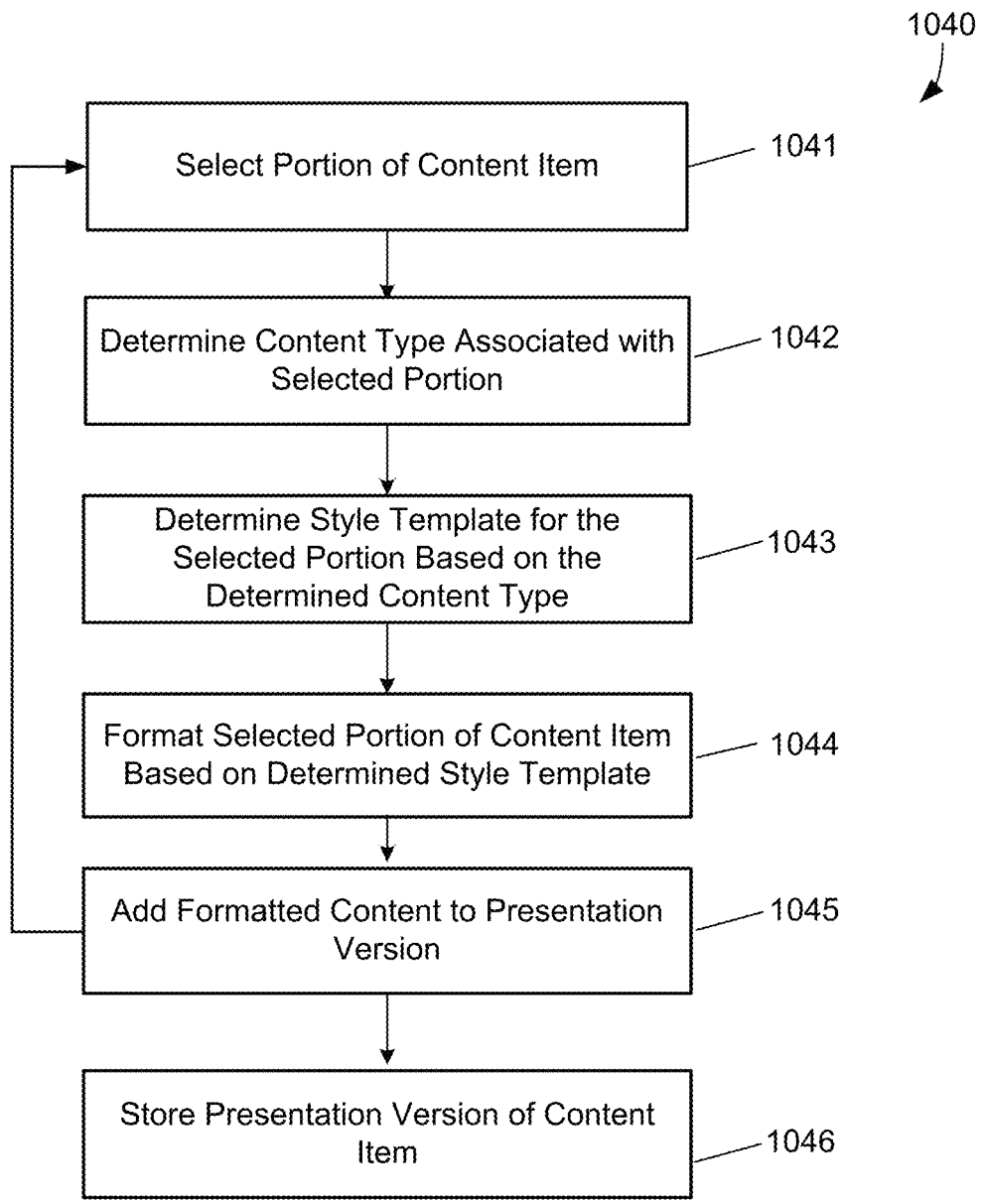
FIG. 10C is a flow diagram of an example process for generating a presentation version of a content item.

FIG. 10C is a flow diagram of an example process 1040 for generating a presentation version of a content item. For example, content management system 106 can generate a presentation of a content item by applying various templates to different portions of the content item, as described below. Content management system 106 can generate a presentation version of a content item in response to a user selecting to present a content item using the presentation mode, as described herein.

At step 1041, a computing device can select a portion of a content item. For example, content management system 106 can traverse the selected content item based on a tree structure generated for the content item, as described herein above. Alternatively, content management system 106 can simply move through the selected content item from beginning to end and identify portions based on various attributes, such as section headings, page splits, tags (e.g., html, xml, or JSON tags), classification identifiers, and/or other formatting or organization characteristics.

At step 1042, the computing device can determine a content type associated with the selected portion. For example, the content type for the selected portion of content can be determined based on labels associated with the selected portion of content. For example, the labels can correspond to classes within HTML, identifier tags, applied styles within the content item, or other labels or metadata associated with the selected portion of content.

At step 1043, the computing device can determine a style template for the selected content portion based on the determined content type. For example, content management system 106 can store a mapping of content types to corresponding style templates. Content management system 106 can determine which style template to apply to the selected portion of content based on the determined content type for the portion of content and the content type-style template mapping.

At step 1044, the computing device can format the selected portion of the content based on the determined style template. For example, content management system 106 can adjust font sizes, layouts, organization, etc., of the selected portion of content according to the presentation styles defined by the determined style template. In some implementations, a style template can include instructions to summarize content. Thus, when this style template is applied to the selected portion of content, the portion of content can be automatically summarized by content management system 106 to reduce the amount of content that will be included in the presentation version of the content item.

At step 1045, content management system 106 can add the formatted portion of content to a presentation version of the content item. For example, as each portion of the content item is formatted, the formatted portion of content can be added to the presentation version of the content item. Content management system 106 can then determine whether the selected content item includes additional portions of content. If additional portions of the content item require formatting for presentation, process 1040 can return to step 1041 to select the next portion of the selected content item to format. If content management system 106 has reached the end of the content item (e.g., all portions of the content item have been formatted for display), then content management system 106 can store the presentation version of the content item at step 1046.

Figure 10D:
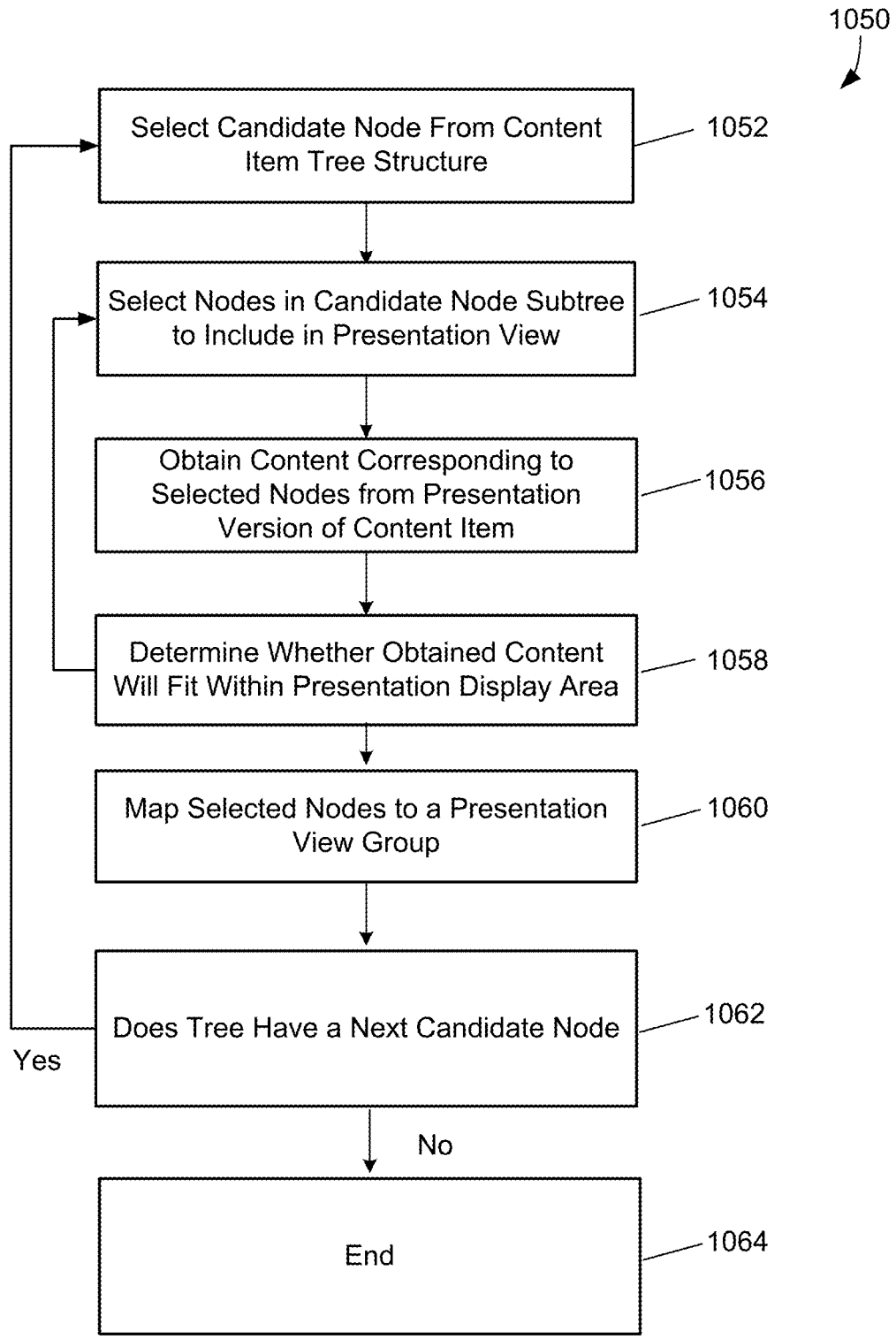
FIG. 10D is a flow diagram of an example process for generating a presentation view for a content item based on a tree structure and a presentation version of the content item.

FIG. 10D is a flow diagram of an example process 1050 for generating a presentation view for a content item based on a tree structure and a presentation version of the content item. For example, process 1050 can be performed at step 1008, described above.

At step 1052, a computing device can select a candidate node from a content item tree structure. For example, content management system 106 can traverse a content item tree generated by process 1030 using pre-order traversal and select the first (or next) node in the tree that has not already been included in a presentation view (e.g., slide). When process 1050 is first started, content management system 106 can select the root node as the candidate node. After generating the first presentation view, content management system 106 can traverse the tree according to pre-order traversal to select the next node in the tree that has not already been included in a presentation view. Thus, content management system 106 can iteratively move through the content item tree generating presentation views for presenting the content in the content item.

At step 1054, the computing device can select nodes in the candidate node subtree to include in the presentation view. For example, content management system 106 can select intermediate nodes within the candidate node subtree and leaf nodes that are associated with some indicia of importance, as described above. For example, content management system 106 can select a node in the candidate node subtree according to pre-order traversal of the candidate node subtree. When the first node is selected, content management system 106 can initialize an accumulated content storage location with no content. Content management system 106 can add content associated with nodes to the accumulated content as nodes are selected for the current presentation view as described below.

At step 1056, the computing device can obtain content corresponding to the selected node from the presentation version of the content item. For example, content management system 106 can obtain the presentation version (e.g., formatted according to various presentation templates) of content associated with the selected node.

At step 1058, the computing device can determine whether the obtained content will fit within the presentation display area. Since the presentation version of the content has already been formatted (e.g., font size, paragraph spacing, etc., applied) and/or modified (e.g. summarized, content management system 106 can determine the amount of space required to present the formatted content associated with the candidate node subtree. Content management system 106 can compare the formatted content to the size of the selected presentation display area to determine whether the content associated with the candidate node subtree will fit within the selected presentation display area. If the content associated with the currently selected node combined with the content in the accumulated content fits within the presentation display area, content management system 106 can add the content associated with the selected node to the accumulated content and loop back to step 1054. If the content associated with the currently selected node combined with the content in the accumulated content does not fit within the presentation display area, content management system 106 can move to step 1060 without adding the content associated with the selected node to the accumulated content.

At step 1060, the computing device can map the nodes selected in the loop between steps 1054 and 1058 to be in a presentation view group. In some implementations, the computing device can then generate a presentation view based on the group. For example, when content management system 106 determines that the accumulated formatted content associated with the selected nodes will fit within the selected presentation display area, content management system 106 can generate a presentation view that includes the content associated with the selected nodes. In some implementations, the designation of a set of nodes to be a presentation view group can be stored for later use in generating a corresponding presentation view.

At step 1062, the computing device can determine whether there is a next candidate node. For example, content management system 106 can determine whether there is a next candidate node by traversing the tree using pre-order traversal to find the next node that has not already been included in a presentation view. When content management system 106 finds another node that has not been included in a presentation view, process 1050 can loop back to step 1052. When content management system 106 determines that all nodes have been evaluated for inclusion in a presentation view, process 1050 can end at step 1064.

Figure 11A:
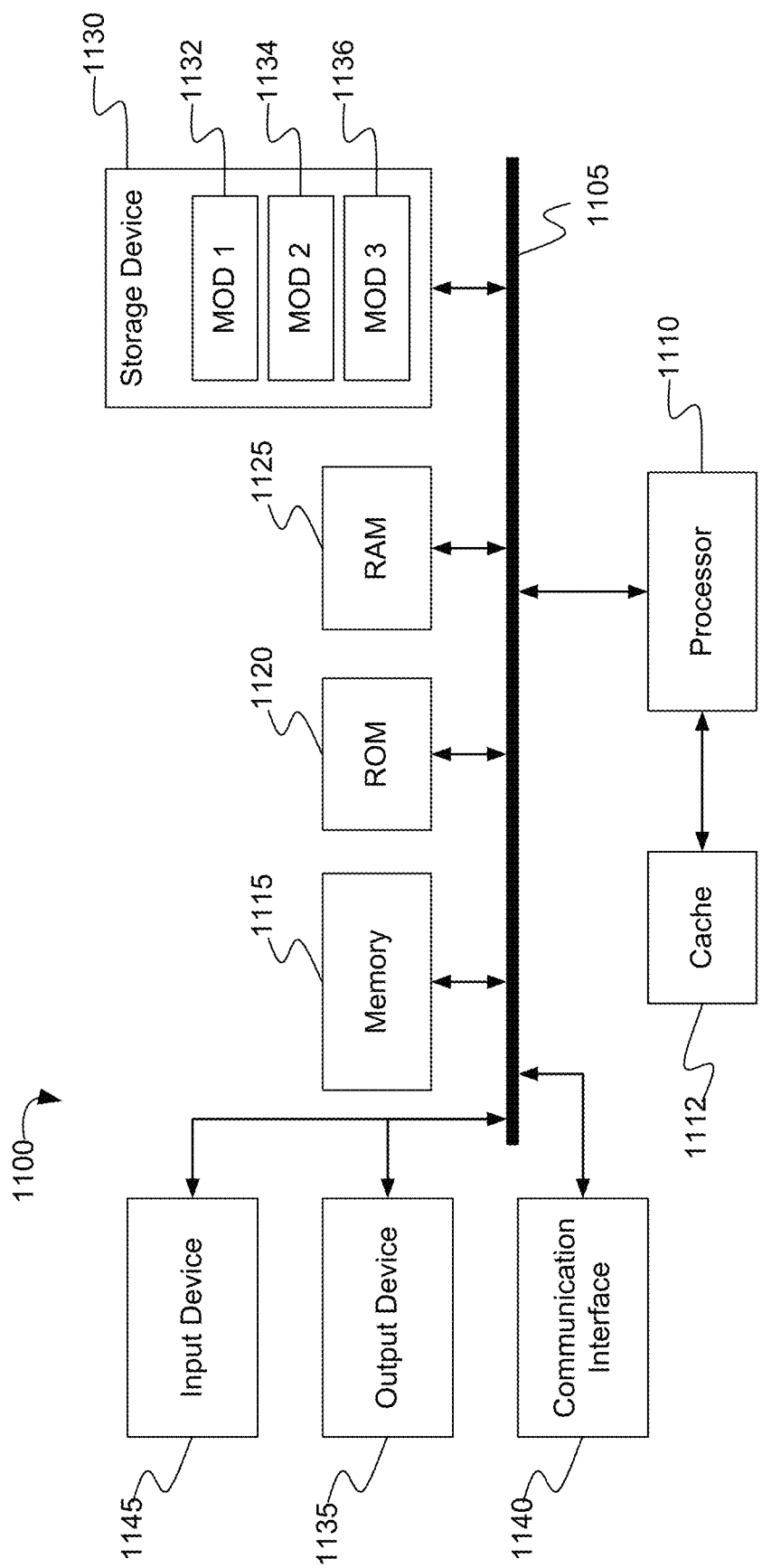
FIG. 11A shows an example possible system embodiment for implementing various embodiments of the present technology.
Figure 11B:
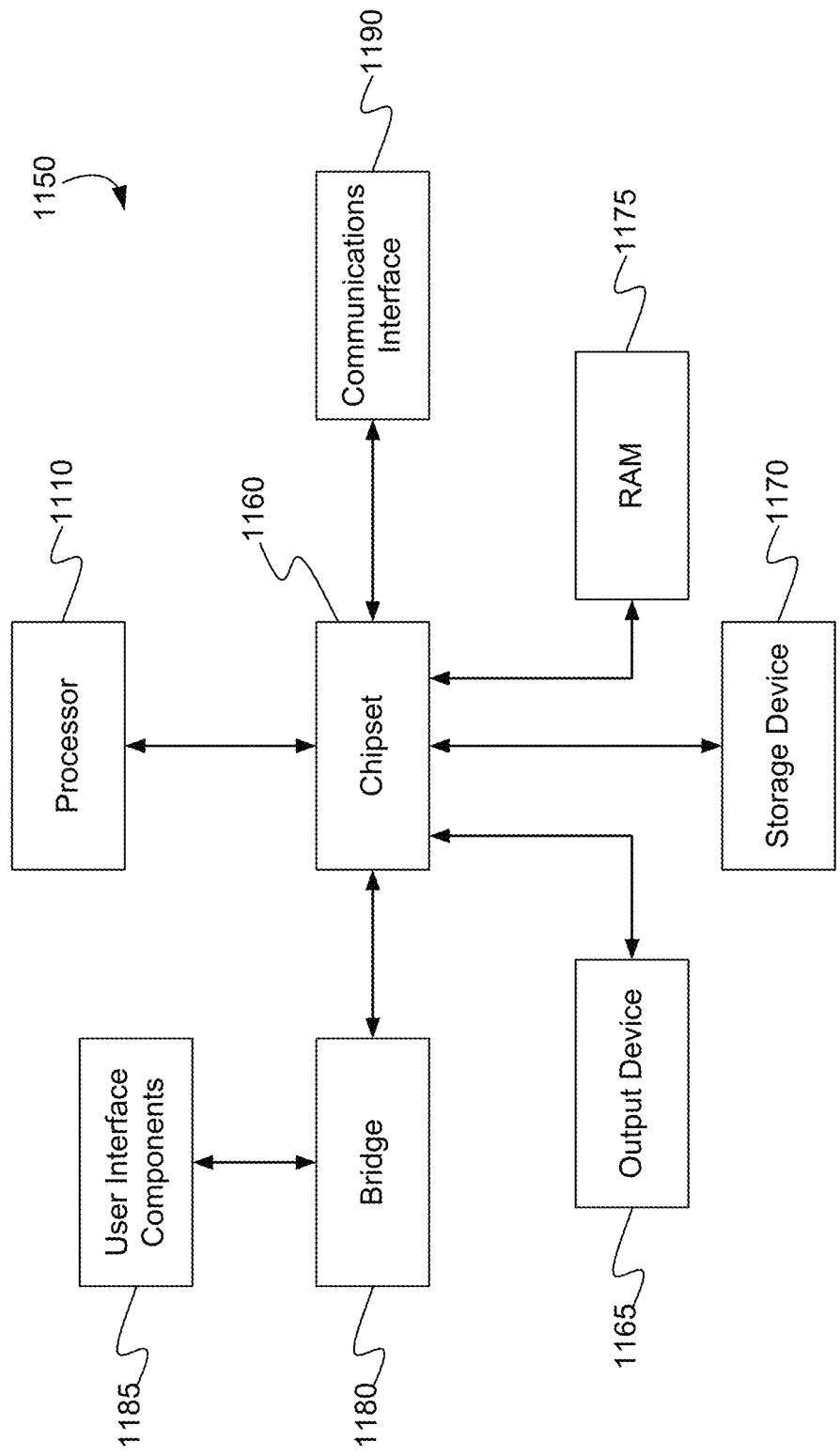
FIG. 11B shows an example possible system embodiment for implementing various embodiments of the present technology.

FIG. 11A and FIG. 11B show example possible system embodiments. The more appropriate embodiment will be apparent to those of ordinary skill in the art when practicing the present technology. Persons of ordinary skill in the art will also readily appreciate that other system embodiments are possible.

FIG. 11A illustrates a conventional system bus computing system architecture 1100 wherein the components of the system are in electrical communication with each other using a bus 1105. Example system 1100 includes a processing unit (CPU or processor) 1110 and a system bus 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1132, module 2 1134, and module 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include software modules 1132, 1134, 1136 for controlling the processor 1110. Other hardware or software modules are contemplated. The storage device 1130 can be connected to the system bus 1105. In one aspect, a hardware module that performs a particular function can include the software component stored in a computer-readable medium in connection with the necessary hardware components, such as the processor 1110, bus 1105, display 1135, and so forth, to carry out the function.

FIG. 11B illustrates a computer system 1150 having a chipset architecture that can be used in executing the described method and generating and displaying a graphical user interface (GUI). Computer system 1150 is an example of computer hardware, software, and firmware that can be used to implement the disclosed technology. System 1150 can include a processor 1110, representative of any number of physically and/or logically distinct resources capable of executing software, firmware, and hardware configured to perform identified computations. Processor 1110 can communicate with a chipset 1160 that can control input to and output from processor 1110. In this example, chipset 1160 outputs information to output 1165, such as a display, and can read and write information to storage device 1170, which can include magnetic media, and solid state media, for example. Chipset 1160 can also read data from and write data to RAM 1175. A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1110 analyzing data stored in storage 1170 or 1175. Further, the machine can receive inputs from a user via user interface components 1185 and execute appropriate functions, such as browsing functions by interpreting these inputs using processor 1110.

It can be appreciated that example systems 1100 and 1150 can have more than one processor 1110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   receiving, by a content management system, an invocation of a presentation mode for a content item accessible to collaborators of the content item for editing and sharing;
   identifying, by the content management system, rules related to one or more indicia of importance, the rules comprising a first value corresponding to a first indicia of importance and a second value corresponding to a second indicia of importance, wherein the first indicia of importance corresponds to comments associated with a particular portion of content and wherein the second indicia of importance corresponds to a revision history associated with another particular portion of content;
   parsing, by the content management system, portions of content corresponding to the first indicia of importance and the second indicia of importance and assigning values to each portion of content based on the identified rules;
   generating, by the content management system, a tree structure representation of the content item, where the tree structure representation includes a plurality of nodes representing structure of content within the content item;
   generating, by the content management system, a presentation view based on the tree structure representation and the one or more indicia of importance by:
      traversing at least one node of the plurality of nodes in the tree structure representation;
      for the at least one node, determining whether the portion of content corresponding to the at least one node has an indicia of importance value above a threshold value, wherein the indicia of importance value is a first indicia of importance value corresponding to the first indicia of importance or a second indicia of importance value corresponding to the second indicia of importance;
      based on the determining, selecting first portions of content that have the indicia of importance value above the threshold value; and
      removing second portions of content that have the indicia of importance value below or at the threshold value;
   providing, by the content management system, the presentation view to a client device;
   storing, by the content management system, the presentation view for subsequent viewing;
   receiving, by the content management system, another request for a presentation mode for the content item;
   determining, by the content management system, that a current version of the content item corresponds to a version of the content item that was used for generating the presentation view; and
   based on the determining, providing, by the content management system, the presentation view without re-generating the presentation view.

2. The method of claim 1, wherein generating the tree structure representation of the content item comprises:
   determining that a first portion of the first portions of content in the content item is associated with the first indicia of importance;
   determining a first particular node in the tree structure representation corresponding to the first portion of content;
   modifying the first particular node to include first attribute information indicating that the first particular node is associated with the first indicia of importance;
   determining that a second portion of the first portions of content in the content item is associated with the second indicia of importance;
   determining a second particular node in the tree structure representation corresponding to the second portion of content; and
   modifying the second particular node to include second attribute information indicated that the second particular node is associated with the second indicia of importance.

3. The method of claim 1, wherein the rules further comprise a third value corresponding to a third indicia of importance corresponding to a link associated with the first portions of content.

4. The method of claim 2, wherein generating the presentation view includes:
determining that the first particular node or the second particular node is associated with at least one of the first indicia of importance and the second indicia of importance based on the first attribute information or the second attribute information; and
selecting a first portion of content corresponding to the first particular node or the second particular node for inclusion in the presentation view based on the determination that the first particular node or the second particular node is associated with the at least one of the first and second indicia of importance.

5. The method of claim 1,
wherein the presentation view is a first presentation view; and
wherein a second presentation view is generated in response to a user-initiated command received after generating the first presentation view, the second presentation view generated by choosing, based on the tree structure representation, a second section of the content item, different from a first section of the content item.

6. The method of claim 2, wherein generating the tree structure representation of the content item is based on identified hierarchical indications within the content item including one or more of:
content with a header designation,
a hierarchical list,
a sequential portion of a table;
a group of text that has a common format in the content item; or
any combination thereof.

7. The method of claim 1, further comprising:
selecting a candidate node from the tree structure representation;
selecting a subtree of the candidate node by determining that content, in the content item, associated with the candidate node and the subtree of the candidate node, will fit within a presentation display area; and
generating the presentation view based on the candidate node and the selected subtree of the candidate node.

8. The method of claim 1, further comprising:
mapping portions of the content item to a template is based on labels assigned to the portions of the content item; and
wherein the labels are based on types of content within the content item or features of the tree structure representation.

9. A non-transitory computer-readable medium including instructions that, when executed by a computing system, cause the computing system to perform operations comprising:
receiving, by a content management system, an invocation of a presentation mode for a content item accessible to collaborators of the content item for editing and sharing;
identifying, by the content management system, rules related to one or more indicia of importance, the rules comprising a first value corresponding to a first indicia of importance and a second value corresponding to a second indicia of importance, wherein the first indicia of importance corresponds to comments associated with a particular portion of content and wherein the second indicia of importance corresponds to a revision history associated with another particular portion of content;
parsing, by the content management system, portions of content corresponding to the one or more indicia of importance and assigning values to each portion of content based on the identified rules;
generating, by the content management system, a tree structure representation of the content item, where the tree structure representation includes a plurality of nodes corresponding to structure of content within the content item;
generating, by the content management system, a presentation view based on the tree structure representation and the one or more indicia of importance by:
traversing at least one node of the plurality of nodes in the tree structure representation;
for the at least one node, determining whether a portion of content corresponding to the at least one node has an indicia of importance value above a threshold value, wherein the indicia of importance value is one of a first indicia of importance value corresponding to the first indicia of importance or a second indicia of importance value corresponding to the second indicia of importance;
based on the determining, selecting first portions of content that have the indicia of importance value above the threshold value; and
removing second portions of content that have the indicia of importance value below or at the threshold value;
sending, by the content management system, the presentation view to a client device for display;
storing, by the content management system, the presentation view for subsequent viewing;
receiving, by the content management system, another request for a presentation mode for the content item;
determining, by the content management system, that a current version of the content item corresponds to a version of the content item that was used for generating the presentation view; and
based on the determining, providing, by the content management system, the presentation view without re-generating the presentation view.

10. The non-transitory computer-readable medium of claim 9, wherein the operations further comprise:
applying, by the content management system, an indicia of importance rule to a particular portion of content corresponding to a particular node in the tree structure representation, wherein the applying is triggered by determining that the particular portion of content is associated with at least one indicia of importance;
computing an indicia of importance value for the particular portion of content based on the applied indicia of importance rule; and
modifying the particular node to include the indicia of importance value.

11. The non-transitory computer-readable medium of claim 10, wherein generating the presentation view based on the tree structure representation comprises:
determining that the particular node is associated with an indicia of importance value above the threshold value; and
selecting the particular portion of content corresponding to the particular node for inclusion in the presentation view based on the determination that the particular node is associated with indicia of importance value above the threshold value.

12. The non-transitory computer-readable medium of claim 9,
wherein content included in the generated presentation view is selected based on a subtree of the tree structure representation; and
wherein the subtree of the tree structure representation is determined by applying a rule specifying that, for a parent node included in the subtree of the tree structure representation, at least a first leaf node of the parent node is to also be included in the subtree of the tree structure representation.

13. The non-transitory computer-readable medium of claim 9,
wherein content included in the generated presentation view is selected based on a subtree of the tree structure representation; and
wherein the subtree of the tree structure representation is determined by applying a rule specifying that, for a parent node corresponding to heading content in the content item, one or more child nodes corresponding to paragraph content in the content item should be included in the subtree of the tree structure representation.

14. The non-transitory computer-readable medium of claim 9,
wherein content included in the generated presentation view is selected based on a subtree of the tree structure representation; and
wherein the subtree of the tree structure representation is determined by applying a rule specifying, (A) for a parent node that is included in the subtree of the tree structure representation and that has no child leaf nodes and (B) where the content, from the content item corresponding to all descendent nodes below the parent node, does not fit in a display area:
selecting at least one node to include in the subtree of the tree structure representation by performing a preorder traversal of at least part of the tree structure representation; and
adding nodes from the preorder traversal to the subtree of the tree structure representation until a node is reached that corresponds to content in the content item that does not fit in the display area.

15. The non-transitory computer-readable medium of claim 9, wherein the operations further comprise:
selecting a candidate node from the tree structure representation;
determining that content in the content item associated with a subtree of the candidate node will fit within a presentation display area and, in response, generating the presentation view based on the subtree.

16. The non-transitory computer-readable medium of claim 15, further comprising:
applying a presentation template to the content item by applying a layout, a format, fonts, or content sizes, to at least some of the portions of the content.

17. A content management system, comprising:
one or more processors; and
a non-transitory computer-readable medium including one or more instructions that, when executed by the one or more processors, cause the content management system to perform operations comprising:
receiving an invocation of a presentation mode for a content item accessible to collaborators of the content item for editing and sharing;
identifying rules related to one or more indicia of importance, the rules comprising a first value corresponding to a first indicia of importance and a second value corresponding to a second indicia of importance, wherein the first indicia of importance corresponds to comments associated with a particular portion of content and wherein the second indicia of importance corresponds to a revision history associated with another particular portion of content;
parsing portions of content corresponding to the one or more indicia of importance and assigning values to each portion of content based on the identified rules;
generating a tree structure representation of the content item, where the tree structure representation includes a plurality of nodes, each node representing a structure of content within the content item;
generating a presentation view by computing content sizing determinations based on presentation styles applied to labeled content in the content item, wherein generating the presentation view comprises:
traversing at least one node of the plurality of nodes in the tree structure representation;
for the at least one node, determining whether a portion of content corresponding to the at least one node has an indicia of importance value above a threshold value, wherein the indicia of importance value is one of a first indicia of importance value corresponding to the first indicia of importance or a second indicia of importance value corresponding to the second indicia of importance;
based on the determining, selecting first portions of content that have the indicia of importance value above the threshold value; and
removing second portions of content that have the indicia of importance value below or at the threshold value; and
providing the generated presentation view;
storing the presentation view for subsequent viewing;
receiving another request for a presentation mode for the content item;
determining that a current version of the content item corresponds to a version of the content item that was used for generating the presentation view; and
based on the determining, providing the presentation view without re-generating the presentation view.

18. The content management system of claim 17, wherein generating the tree structure representation of the content item comprises:
determining that a first portion of the first portions of content in the content item is associated with the first indicia of importance;
determining a first particular node in the tree structure representation corresponding to the first portion of content;
modifying the first particular node to include first attribute information indicating that the first particular node is associated with the first indicia of importance;
determining that a second portion of the first portions of content in the content item is associated with the second indicia of importance;
determining a second particular node in the tree structure representation corresponding to the second portion of content; and modifying the second particular node to include second attribute information indicated that the second particular node is associated with the second indicia of importance.

19. The content management system of claim 18, wherein generating the presentation view includes:
determining that the first particular node or the second particular node is associated with at least one of the first indicia of importance and the second indicia of importance based on the first attribute information or the second attribute information; and
selecting a first portion of content corresponding to the first particular node or the second particular node for inclusion in the presentation view based on the determination that the first particular node or the second particular node is associated with the at least one of the first and second indicia of importance.

20. The content management system of claim 17, wherein the operations further comprise:
selecting a candidate node from the tree structure representation;
selecting a subtree of the candidate node by determining that content, with a style applied for the presentation mode and associated with the subtree of the candidate node, will fit within a presentation display area; and
generating the presentation view based on the candidate node and the selected subtree of the candidate node.

* * * * *